US012122159B2

(12) United States Patent
Nakayama

(10) Patent No.: US 12,122,159 B2
(45) Date of Patent: Oct. 22, 2024

(54) HEAD CHIP, LIQUID JET HEAD, AND LIQUID JET RECORDING DEVICE

(71) Applicant: SII Printek Inc., Chiba (JP)

(72) Inventor: Hitoshi Nakayama, Chiba (JP)

(73) Assignee: SII PRINTEK INC., Chiba (JP)

(*) Notice: Subject to any disclaimer, the term of this patent is extended or adjusted under 35 U.S.C. 154(b) by 69 days.

(21) Appl. No.: 18/082,257

(22) Filed: Dec. 15, 2022

(65) Prior Publication Data

US 2023/0191781 A1 Jun. 22, 2023

(30) Foreign Application Priority Data

Dec. 20, 2021 (JP) ................................. 2021-206355

(51) Int. Cl.
*B41J 2/14* (2006.01)

(52) U.S. Cl.
CPC ....... *B41J 2/14209* (2013.01); *B41J 2/14201* (2013.01); *B41J 2/14072* (2013.01); *B41J 2002/14225* (2013.01)

(58) Field of Classification Search
CPC ................ B41J 2/14209; B41J 2/14201; B41J 2/14072; B41J 2002/14225
See application file for complete search history.

(56) References Cited

U.S. PATENT DOCUMENTS

| | | | |
|---|---|---|---|
| 4,584,590 A | 4/1986 | Fischbeck et al. | |
| 5,402,159 A * | 3/1995 | Takahashi | B41J 2/04573 310/317 |
| 8,998,381 B2 * | 4/2015 | Domae | B41J 2/14209 347/69 |
| 2002/0015082 A1 | 2/2002 | Asano | |

FOREIGN PATENT DOCUMENTS

| | | |
|---|---|---|
| EP | 3587115 A1 | 1/2020 |
| JP | 2007-203737 A | 8/2007 |
| JP | 2009-231777 A | 10/2009 |

(Continued)

OTHER PUBLICATIONS

Notice of reasons for refusal in Japan Application No. 2021-206355, including English translation, dated Feb. 8, 2022, 6 pages.

(Continued)

*Primary Examiner* — Geoffrey S Mruk
(74) *Attorney, Agent, or Firm* — Crowell & Moring LLP

(57) ABSTRACT

A head chip, a liquid jet head, and a liquid jet recording device each capable of increasing pressure generated while achieving power saving are provided. The head chip according to an aspect of the present disclosure includes a flow channel member having a pressure chamber containing liquid, an actuator plate which is stacked on the flow channel member in a state of being opposed to the pressure chamber in a first direction, a drive electrode which is formed on a surface facing to the first direction in the actuator plate, and which is configured to deform the actuator plate in the first direction to change a volume of the pressure chamber, and a non-drive member which is stacked at an opposite side to the flow channel member across the actuator plate in the first direction, and which is configured to limit a displacement of the actuator plate toward an opposite side to the flow channel member in the first direction.

7 Claims, 20 Drawing Sheets

(56) References Cited

FOREIGN PATENT DOCUMENTS

| | | | |
|---|---|---|---|
| JP | 2011-005815 | A | 1/2011 |
| JP | 2012-126046 | A | 7/2012 |
| JP | 2021-123063 | A | 8/2021 |
| WO | WO 00/16981 | A1 | 3/2000 |

OTHER PUBLICATIONS

Decision of refusal in Japan Application No. 2021-206355, including English translation, dated Apr. 26, 2022, 6 pages.
Extended European Search Report in Europe Application No. 22214396.8, dated May 16, 2023, 7 pages.
Office Action/Notice of reasons for refusal for Japan application No. 2022-114244, including English translation, dated June 13, 2023, 6 pages.

* cited by examiner

HEAD CHIP, LIQUID JET HEAD, AND LIQUID JET RECORDING DEVICE

RELATED APPLICATIONS

This application claims priority to Japanese Patent Application No. 2021-206355 filed on Dec. 20, 2021, the entire content of which is incorporated herein by reference.

BACKGROUND OF THE INVENTION

1. Field of the Invention

The present disclosure relates to a head chip, a liquid jet head, and a liquid jet recording device.

2. Description of the Related Art

A head chip to be mounted on an inkjet printer ejects ink contained in a pressure chamber through a nozzle hole to thereby print information such as a character or an image on a recording target medium. In the head chip, in order to make the head chip eject the ink, first, an electric field is generated in an actuator plate formed of a piezoelectric material to thereby deform the actuator plate. In the head chip, by changing a volume in the pressure chamber due to the deformation of the actuator plate to increase the pressure in the pressure chamber, the ink is ejected through the nozzle hole.

Here, as a deformation mode of the actuator plate, there is cited a so-called shear mode in which a shear deformation (a thickness-shear deformation) is caused in the actuator plate due to the electric field generated in the actuator plate. In the shear mode, a so-called roof-shoot type head chip has a configuration in which the actuator plate is arranged so as to be opposed to the pressure chambers provided to a flow channel member (see, e.g., the specification of U.S. Pat. No. 4,584,590 (Patent Literature 1)).

In the roof-shoot type head chip, by the actuator plate deforming in the thickness direction, the volume of the pressure chamber varies. In the configuration of Patent Literature 1, a space for allowing the deformation of the actuator plate is formed at an opposite side to the flow channel member with respect to the actuator plate.

Incidentally, in order to efficiently drive (deform) the actuator plate, the thinner the thickness of the actuator plate is, the preferable. However, when making the actuator plate thin, the actuator plate decreases in rigidity. Then, in the actuator plate, there is a possibility that a theoretical deformation behavior caused by voltage application is hindered by a resistive force (compliance) of the ink located in the pressure chamber. As a result, there is a possibility that pressure generated in the pressure chamber cannot be ensured when ejecting the ink. In the roof-shoot type head chip, in order to ensure the generated pressure, it is necessary to increase the drive voltage.

SUMMARY OF THE INVENTION

The present disclosure provides a head chip, a liquid jet head, and a liquid jet recording device each capable of increasing the pressure generated in a pressure chamber when ejecting ink while achieving power saving.

In view of the problems described above, the present disclosure adopts the following aspects.

(1) A head chip according to an aspect of the present disclosure includes a flow channel member having a pressure chamber containing liquid, an actuator plate which is stacked on the flow channel member in a state of being opposed to the pressure chamber in a first direction, a drive electrode which is formed on a surface facing to the first direction in the actuator plate, and which is configured to deform the actuator plate in the first direction to change a volume of the pressure chamber, and a non-drive member which is stacked at an opposite side to the flow channel member across the actuator plate in the first direction, and which is configured to limit a displacement of the actuator plate toward an opposite side to the flow channel member in the first direction.

According to the present aspect, it is possible to regulate the displacement of the actuator plate toward the opposite side to the flow channel member in the first direction with respect to the resistive force of the liquid acting on the actuator plate due to, for example, the pressure of the liquid in the pressure chamber using the non-drive member. Thus, it results that the actuator plate exhibits the theoretical deformation behavior due to the application of the voltage, and it is possible to effectively transfer the deformation of the actuator plate toward the pressure chamber. In this case, it is possible to efficiently drive the actuator plate compared to when ensuring the rigidity which can bear the resistive force of the liquid by increasing the thickness of the actuator plate itself. As a result, it is possible to increase the pressure generated in the pressure chamber when deforming the actuator plate to thereby achieve power saving.

(2) In the head chip according to the aspect (1) described above, the non-drive member can be thicker in thickness in the first direction than the actuator plate.

According to the present aspect, since it becomes easy to ensure the rigidity of the non-drive member, when deforming the actuator plate, the displacement of the actuator plate toward the opposite side to the flow channel member in the first direction is effectively regulated, and thus, it becomes easy for the actuator plate to exhibit the theoretical deformation behavior due to the application of the voltage.

(3) In the head chip according to one of the aspects (1) and (2) described above, the non-drive member can include a first buffer lower in compressive elasticity modulus than the actuator plate, and a rigid member which is disposed at an opposite side to the actuator plate in the first direction across the first buffer, and which is higher in compressive elasticity modulus than the first buffer.

According to the present aspect, the first buffer is arranged between the rigid member and the actuator plate. Thus, by the buffer deforming due to the deformation of the actuator plate, it is possible to regulate the displacement of the actuator plate by the rigid member while allowing the deformation of the actuator plate. Thus, it is possible to ensure the deformation amount corresponding to the power supplied to the drive electrode in the actuator plate.

(4) In the head chip according to any of the aspects (1) through (3) described above, a plurality of the pressure chambers can be arranged across partition walls in a second direction crossing the first direction, and the non-drive member can bridge the partition walls located at both sides in the second direction with respect to one of the pressure chambers.

According to the present aspect, since the non-drive member bridges the partition walls, it is easy to ensure the rigidity of the non-drive member. Thus, the displacement of the actuator plate toward the opposite side to the flow channel member in the first direction is suppressed, and it becomes easy for the actuator plate to exhibit the theoretical deformation behavior due to the application of the voltage.

(5) In the head chip according to any of the aspects (1) through (4) described above, the pressure chamber can include an opening part opening toward the actuator plate in the first direction, the opening part can be closed by a second buffer lower in compressive elasticity modulus than the actuator plate, and the actuator plate can be disposed at an opposite side to the flow channel member across the second buffer.

According to the present aspect, since the second buffer is disposed so as to close the opening part between the actuator plate and the flow channel member, it is possible to relax the resistive force of the liquid acting through the opening part using the second buffer. Thus, the displacement of the actuator plate toward the opposite side to the flow channel member in the first direction is suppressed, and it becomes easy for the actuator plate to exhibit the theoretical deformation behavior due to the application of the voltage.

(6) A liquid jet head according to an aspect of the present disclosure includes the head chip according to any of the aspects (1) through (5) described above.

According to the present aspect, it is possible to provide a liquid jet head which is power-saving and high-performance.

(7) A liquid jet recording device according to an aspect of the present disclosure includes the liquid jet head according to the aspect (6) described above.

According to the present aspect, it is possible to provide a liquid jet recording device which is power-saving and high-performance.

According to an aspect of the present disclosure, it is possible to increase the pressure generated while achieving the power saving.

DETAILED DESCRIPTION OF THE PREFERRED EMBODIMENTS

Figure 1:
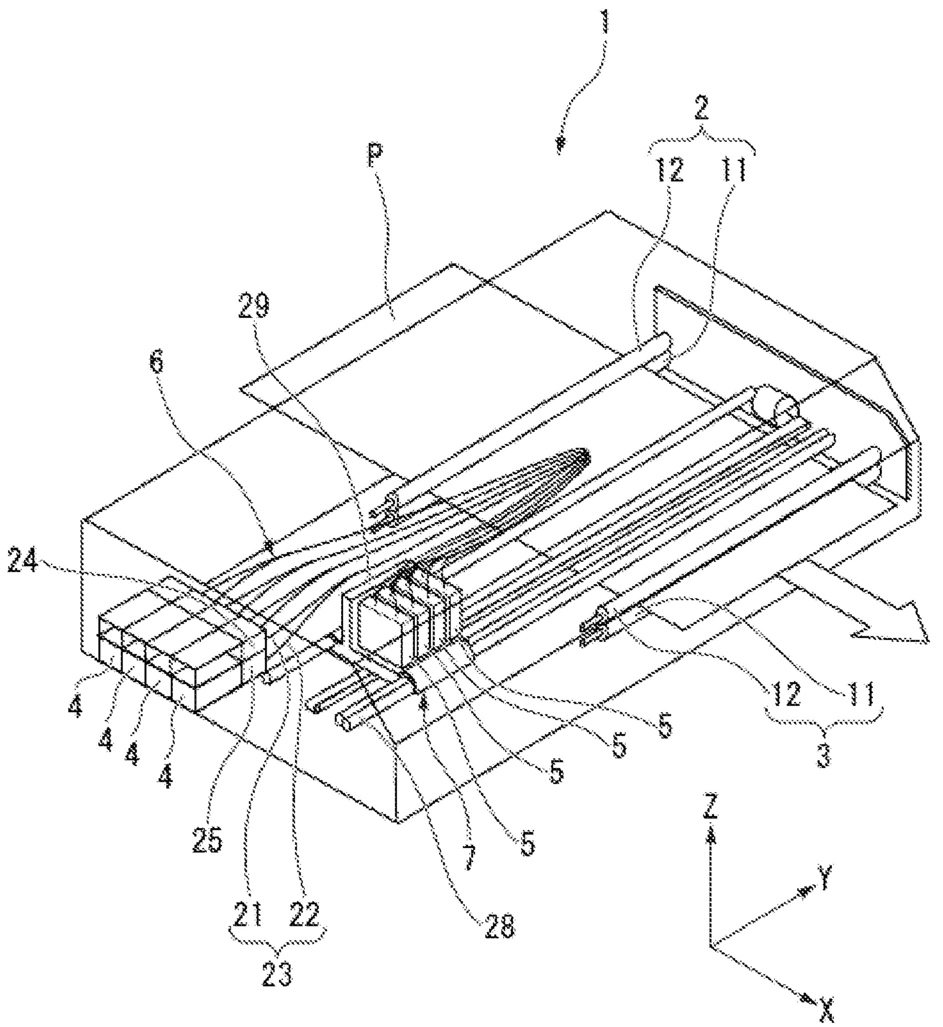
FIG. 1 is a schematic configuration diagram of an inkjet printer according to an embodiment.

An embodiment according to the present disclosure will hereinafter be described with reference to the drawings. In the embodiment and modified examples described hereinafter, constituents corresponding to each other are denoted by the same reference symbols, and the description thereof will be omitted in some cases. In the following description, expressions representing relative or absolute arrangement such as "parallel," "perpendicular," "center," and "coaxial" not only represent strictly such arrangements, but also represent the state of being relatively displaced with a tolerance, or an angle or a distance to the extent that the same function can be obtained. In the following embodiment, the description will be presented citing an inkjet printer (hereinafter simply referred to as a printer) for performing recording on a recording target medium using ink (liquid) as an example. The scale size of each member is arbitrarily modified so as to provide a recognizable size to the member in the drawings used in the following description.

First Embodiment

[Printer 1]

FIG. 1 is a schematic configuration diagram of a printer 1.

The printer (a liquid jet recording device) 1 shown in FIG. 1 is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, an X direction coincides with a conveying direction (a sub-scanning direction) of a recording target medium P (e.g., paper). A Y direction coincides with a scanning direction (a main scanning direction) of the scanning mechanism 7. A Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present specification, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink tanks 4 respectively contain four colors of ink such as yellow ink, magenta ink, cyan ink, and black ink. The inkjet heads 5 are configured so as to be able to respectively eject the four colors of ink, namely the yellow ink, the magenta ink, the cyan ink, and the black ink in accordance with the ink tanks 4 coupled thereto.

Figure 2:
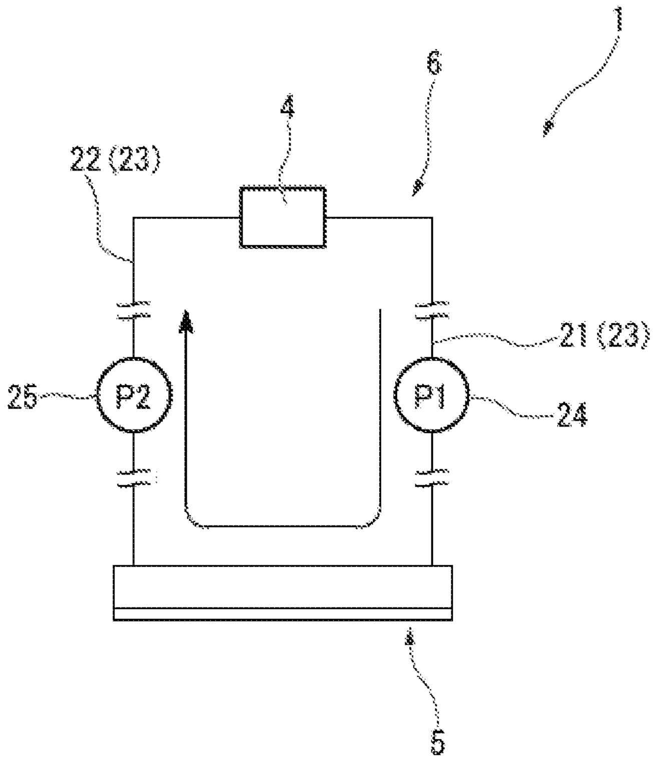
FIG. 2 is a schematic configuration diagram of an inkjet head and an ink circulation mechanism according to the embodiment.

FIG. 2 is a schematic configuration diagram of the inkjet head 5 and the ink circulation mechanism 6.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the ink jet head 5.

The suction pump 25 depressurizes an inside of the ink discharge tube 22 to suction the ink from the inkjet head 5 through the ink discharge tube 22. Thus, the ink discharge tube 22 is provided with negative pressure with respect to the ink jet head 5. It is arranged that the ink can circulate between the inkjet head 5 and the ink tank 4 through the circulation flow channel 23 by driving the pressure pump 24 and the suction pump 25.

As shown in FIG. 1, the scanning mechanism 7 reciprocates the inkjet heads 5 in the Y direction. The scanning mechanism 7 is provided with a guide rail 28 extending in the Y direction, and a carriage 29 movably supported by the guide rail 28.

<Inkjet Heads 5>

The inkjet heads 5 are mounted on the carriage 29. In the illustrative example, the plurality of inkjet heads 5 is mounted on the single carriage 29 so as to be arranged side by side in the Y direction. The inkjet heads 5 are each provided with a head chip 50 (see FIG. 3), an ink supply section (not shown) for coupling the ink circulation mechanism 6 and the head chip 50, and a controller (not shown) for applying a drive voltage to the head chip 50.

<Head Chip 50>

Figure 3:
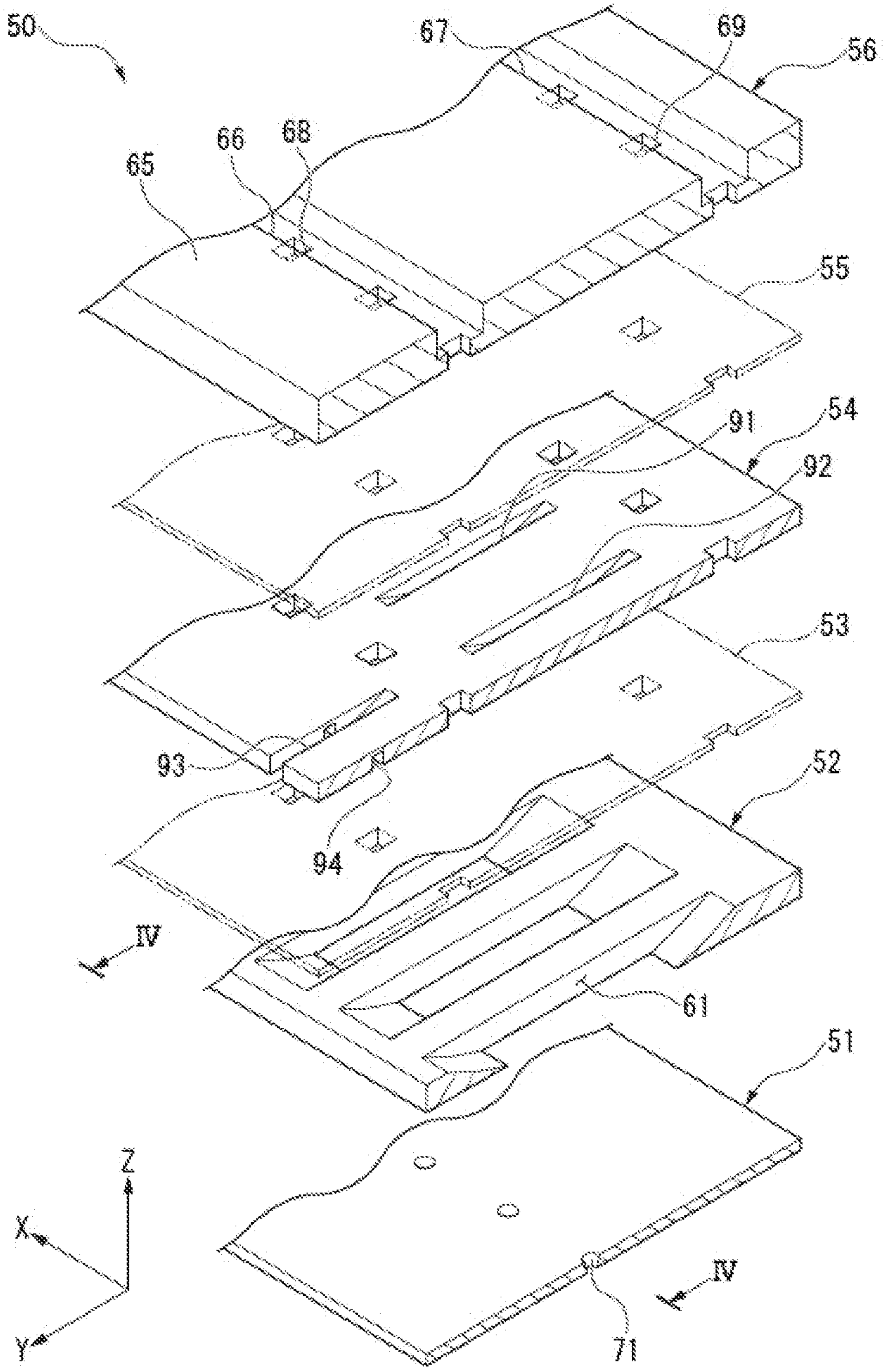
FIG. 3 is an exploded perspective view of a head chip according to the embodiment.
Figure 4:
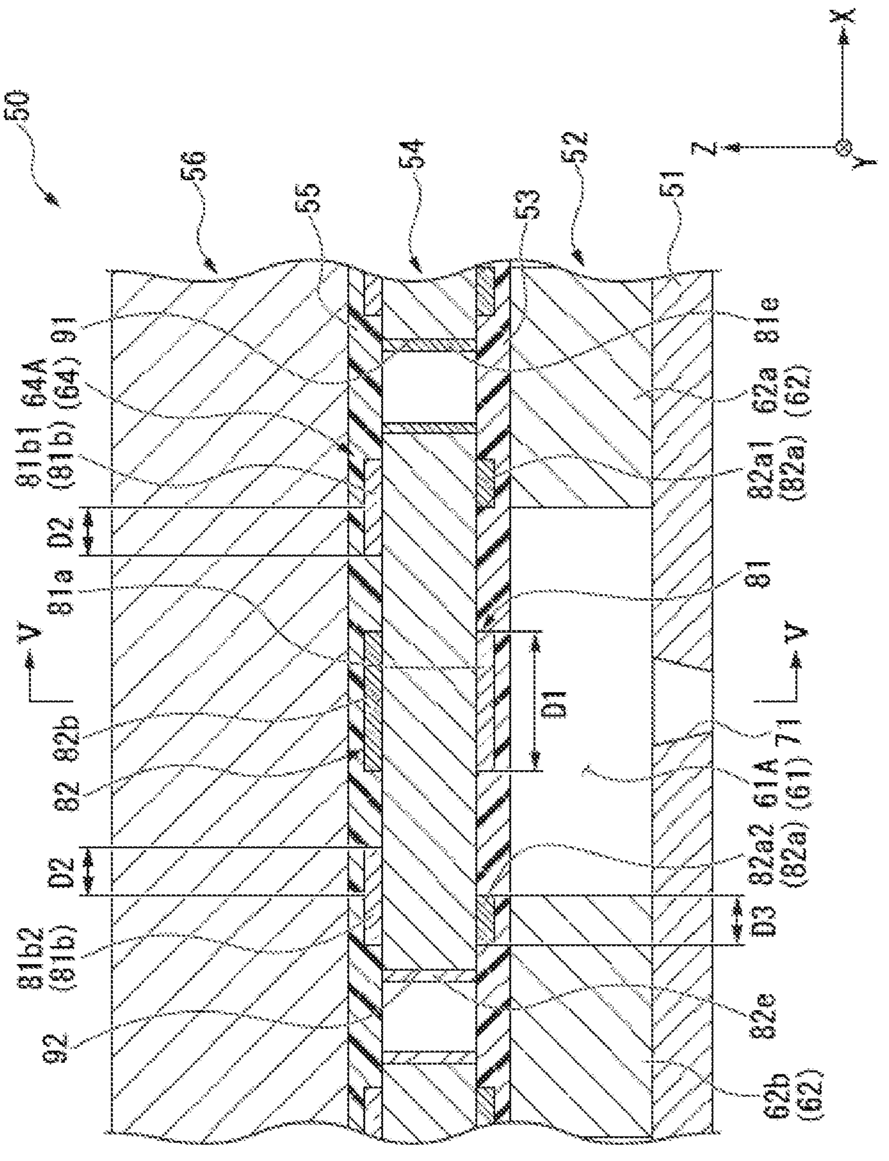
FIG. 4 is a cross-sectional view of the head chip corresponding to the line IV-IV shown in FIG. 3.
Figure 5:
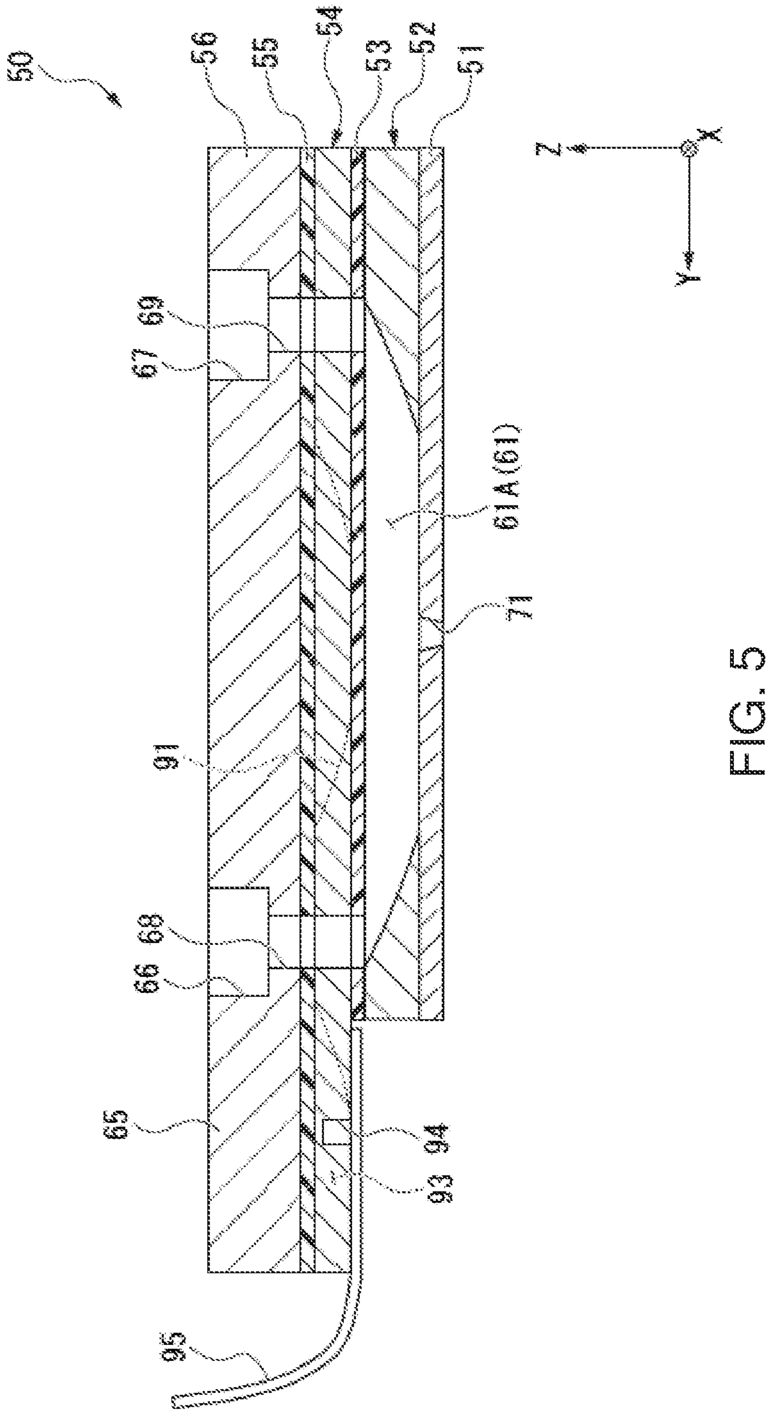
FIG. 5 is a cross-sectional view of the head chip corresponding to the line V-V shown in FIG. 4.

FIG. 3 is an exploded perspective view of the head chip 50. FIG. 4 is a cross-sectional view of the head chip 50 corresponding to the line IV-IV shown in FIG. 3. FIG. 5 is a cross-sectional view of the head chip 50 corresponding to the line V-V shown in FIG. 4.

The head chip 50 shown in FIG. 3 through FIG. 5 is a so-called recirculating side-shoot type head chip 50 which circulates the ink with the ink tank 4, and at the same time, ejects the ink from a central portion in an extending direction (the Y direction) in a pressure chamber 61 described later. The head chip 50 is provided with a nozzle plate 51, a flow channel member 52, a first film 53, an actuator plate 54, a second film 55, and a cover plate 56. In the following explanation, the description is presented in some cases defining a direction (+Z side) from the nozzle plate 51 toward the cover plate 56 along the Z direction as an upper side, and a direction (−Z side) from the cover plate 56 toward the nozzle plate 51 along the Z direction as a lower side.

The flow channel member 52 is shaped like a plate setting a thickness direction to the Z direction. The flow channel member 52 is formed of a material having ink resistance. As such a material, it is possible to adopt, for example, metal, metal oxide, glass, resin, and ceramics. The flow channel member 52 is provided with a plurality of pressure chambers 61. The pressure chambers 61 each contain the ink. The pressure chambers 61 are arranged in the X direction at intervals. Therefore, in the flow channel member 52, a portion located between the pressure chambers 61 adjacent to each other constitutes a partition wall 62 for partitioning the pressure chambers 61 adjacent to each other in the X direction.

The pressure chambers 61 are each formed like a groove linearly extending in the Y direction. The pressure chambers 61 each penetrate the flow channel member 52 in at least a part (a central portion in the Y direction in the present embodiment) in the Y direction. It should be noted that the configuration in which a channel extension direction coincides with the Y direction will be described in the present embodiment, but the channel extension direction can cross the Y direction. Further, a planar shape of the pressure chamber 61 is not limited to a rectangular shape (a shape setting a longitudinal direction to either one of the X direction and the Y direction, and setting a short-side direction to the other thereof). The planar shape of the pressure chamber 61 can be a polygonal shape such as a square shape or a triangular shape, a circular shape, an elliptical shape, or the like.

The nozzle plate 51 is fixed to a lower surface of the flow channel member 52 with bonding or the like. The nozzle plate 51 becomes equivalent in planar shape to the flow channel member 52. Therefore, the nozzle plate 51 closes a lower end opening part of the pressure chamber 61. In the present embodiment, the nozzle plate 51 is formed of a resin material such as polyimide so as to have a thickness in a range of several tens through one hundred and several tens of micrometers. It should be noted that it is possible for the nozzle plate 51 to have a single layer structure or a laminate structure with a metal material (SUS, Ni—Pd, or the like), glass, silicone, or the like besides the resin material.

The nozzle plate 51 is provided with a plurality of nozzle holes 71 penetrating the nozzle plate 51 in the Z direction. The nozzle holes 71 are arranged at intervals in the X direction. The nozzle holes 71 are each communicated with corresponding one of the pressure chambers 61 in a central portion in the X direction and the Y direction. In the present embodiment, each of the nozzle holes 71 is formed to have, for example, a taper shape having an inner diameter gradually decreasing along a direction from the upper side toward the lower side. In the present embodiment, there is described the configuration in which the plurality of pressure chambers 61 and the plurality of nozzle holes 71 are aligned in the X direction, but this configuration is not a limitation. Defining the plurality of pressure chambers 61 and the plurality of nozzle holes 71 arranged in the X direction as a nozzle array, it is possible to dispose two or more nozzle arrays at intervals in the Y direction. In this case, defining the number of nozzle arrays as n, it is preferable for an arrangement pitch in the Y direction of the nozzle holes 71 (the pressure chambers 61) in one of the nozzle arrays to be arranged so as to be shifted by 1/n pitch with respect to the arrangement pitch of the nozzle holes 71 in another nozzle array adjacent to that nozzle array.

The first film 53 is fixed to an upper surface of the flow channel member 52 with bonding or the like. The first film 53 is arranged throughout the entire area of the upper surface of the flow channel member 52. Thus, the first film 53 closes an upper end opening part of each of the pressure chambers 61. The first film 53 is formed of an elastically deformable material having an insulating property and ink resistance. As such a material, the first film 53 is formed of, for example, a resin material (a polyimide type, an epoxy type, a polypropylene type, and so on). In the present embodiment, the term "elastically deformable" means that the material is lower in compressive elasticity modulus compared to a member adjacent thereto in the Z direction in a state in which two or more members are stacked on one another. In other words, the first film 53 is lower in compressive elasticity modulus than the flow channel member 52 and the actuator plate 54.

The actuator plate 54 is fixed to an upper surface of the first film 53 with bonding or the like setting the thickness direction to the Z direction. The planar shape of the actuator plate 54 is larger than the planar shape of the flow channel member 52. Therefore, the actuator plate 54 is opposed to the pressure chambers 61 in the Z direction across the first film 53. It should be noted that the actuator plate 54 is not limited to the configuration of covering the pressure chambers 61 in a lump, but can individually be disposed for each of the pressure chambers 61.

The actuator plate 54 is formed of a piezoelectric material such as PZT (lead zirconate titanate). The actuator plate 54 is set so that a polarization direction is a direction toward the −Z side. On both surfaces of the actuator plate 54, there are formed drive interconnections 64. The actuator plate 54 is configured so as to be able to be deformed in the Z direction by an electric field being generated by a voltage applied by the drive interconnections 64. The actuator plate 54 expands or contracts the volume in the pressure chambers 61 due to the deformation in the Z direction to thereby eject the ink from the inside of the pressure chambers 61. It should be noted that the configuration of the drive interconnections 64 will be described later.

The second film 55 is fixed to an upper surface of the actuator plate 54 with bonding or the like. In the present embodiment, the second film 55 covers the entire area of the upper surface of the actuator plate 54. The second film 55 is formed of an elastically deformable material having an insulating property. As such a material, it is possible to adopt substantially the same material as that of the first film 53. In other words, the second film 55 is lower in compressive elasticity modulus than the flow channel member 52 and the actuator plate 54.

The cover plate 56 is fixed to an upper surface of the second film 55 with bonding or the like setting the thickness direction to the Z direction. The cover plate 56 is thicker in thickness in the Z direction than the actuator plate 54, the flow channel member 52, and the films 53, 55. In the present embodiment, the cover plate 56 is formed of metal, metal oxide, glass, resin, ceramics, or the like similarly to the flow channel member 52. The cover plate 56 is higher in compressive elasticity modulus than at least the second film 55. As shown in FIG. 5, in the cover plate 56, the second film 55, and the actuator plate 54, portions projecting toward the +Y side with respect to the flow channel member 52 constitute a tail part 65.

The cover plate 56 is provided with an entrance common ink chamber 66 and an exit common ink chamber 67.

The entrance common ink chamber 66 is formed at a position overlapping, for example, a +Y-side end portion of the pressure chamber 61 when viewed from the Z direction. The entrance common ink chamber 66 extends in the X direction with a length sufficient for straddling, for example, the pressure chambers 61, and at the same time, opens on an upper surface of the cover plate 56.

The exit common ink chamber 67 is formed at a position overlapping, for example, a −Y-side end portion of the pressure chamber 61 when viewed from the Z direction. The exit common ink chamber 67 extends in the X direction with a length sufficient for straddling, for example, the pressure chambers 61, and at the same time, opens on the upper surface of the cover plate 56.

In the entrance common ink chamber 66, at positions overlapping the respective pressure chambers 61 viewed from the Z direction, there are formed entrance slits 68. The entrance slits 68 penetrate the cover plate 56, the second film 55, the actuator plate 54, and the first film 53 in the Z direction. The entrance slits 68 each make the pressure chamber 61 and the entrance common ink chamber 66 be communicated with each other.

In the exit common ink chamber 67, at positions overlapping the respective pressure chambers 61 viewed from the Z direction, there are formed exit slits 69. The exit slits 69 penetrate the cover plate 56, the second film 55, the actuator plate 54, and the first film 53 in the Z direction. The exit slits 69 each make the pressure chamber 61 and the exit common ink chamber 67 be communicated with each other.

Figure 6:
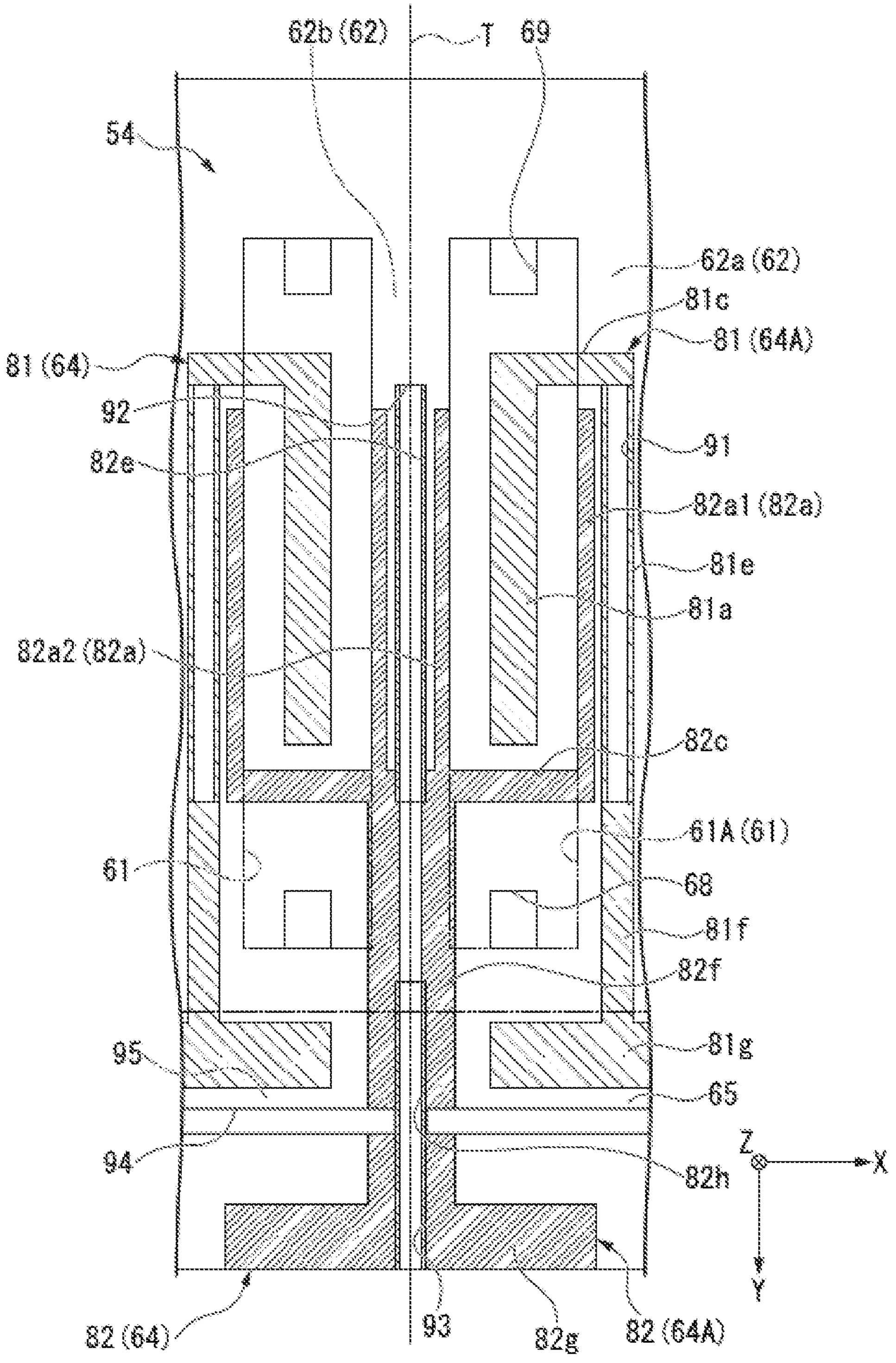
FIG. 6 is a bottom view of an actuator plate related to the embodiment.
Figure 7:
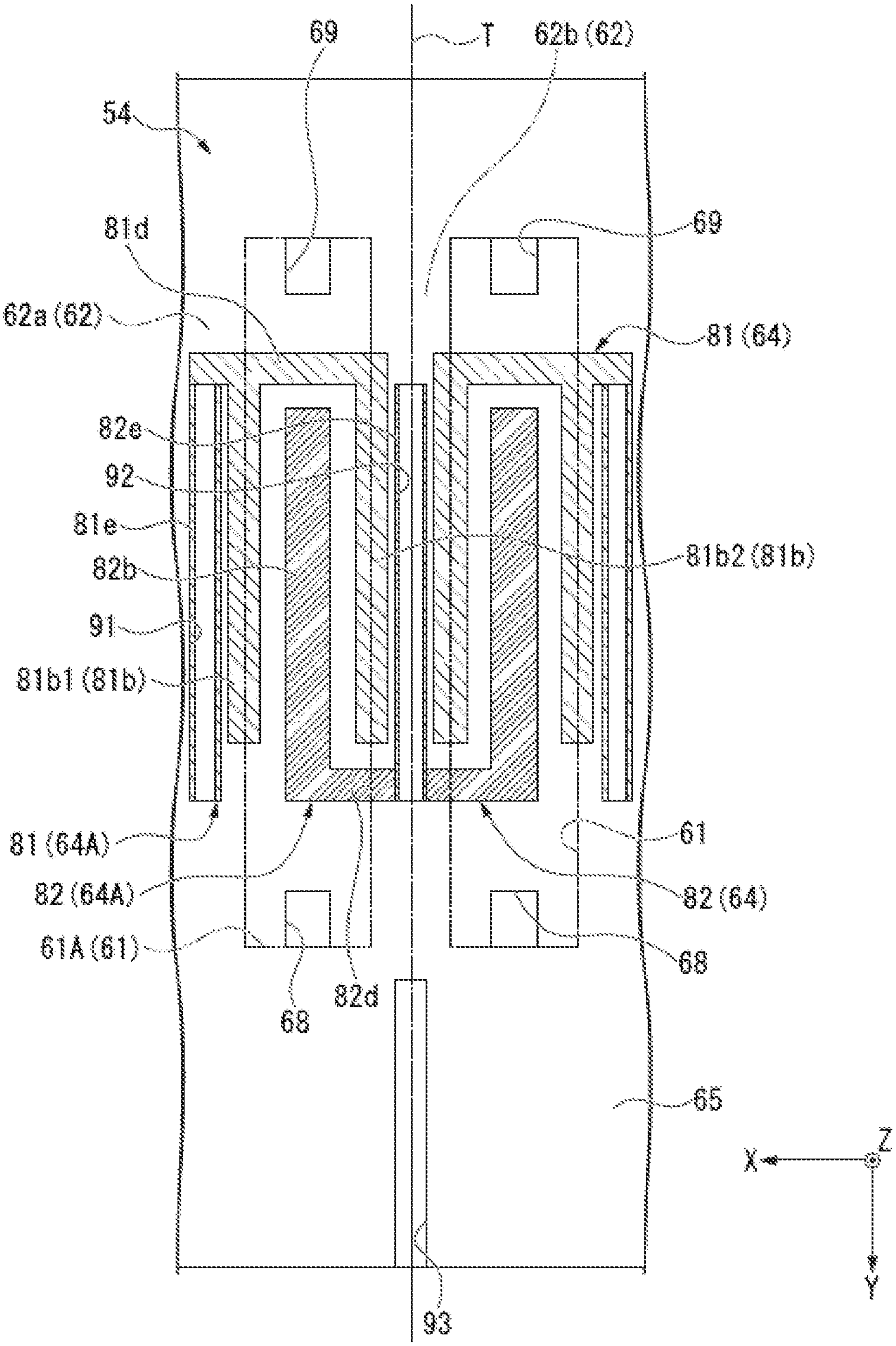
FIG. 7 is a plan view of the actuator plate related to the embodiment.

Subsequently, a structure of the drive interconnections 64 will be described. FIG. 6 is a bottom view of the actuator plate 54. FIG. 7 is a plan view of the actuator plate 54. The drive interconnections 64 are disposed so as to correspond to the pressure chambers 61. The drive interconnections 64 corresponding to the pressure chambers 61 adjacent to each other are formed line-symmetrically with reference to a symmetry axis T along the Y direction. In the following explanation, drive interconnections 64A disposed so as to correspond to one pressure chamber 61A out of the plurality of pressure chambers 61 are described as an example, and the description of the drive interconnections 64 corresponding other pressure chambers 61 will arbitrarily be omitted.

As shown in FIG. 6 and FIG. 7, the drive interconnections 64A consist of a common interconnection 81 and an individual interconnection 82.

The common interconnection 81 is provided with a first common electrode 81*a*, second common electrodes 81*b*, a lower-surface patterned interconnection 81*c*, an upper-surface patterned interconnection 81*d*, a through interconnection 81*e*, a common coupling interconnection 81*f*, and a common pad 81*g*. It should be noted that in the common interconnection 81, it is preferable to dispose an insulator (e.g., $SiO_2$) not shown between the actuator plate 54 and the portions (the lower-surface patterned interconnection 81*c*, the upper-surface patterned interconnection 81*d*, the through interconnection 81*e*, the common coupling interconnection 81*f*, and the common pad 81*g*) other than the common electrodes 81*a*, 81*b*.

As shown in FIG. 4 and FIG. 6, the first common electrode 81*a* linearly extends in the Y direction at a position opposed to the corresponding pressure chamber 61 in the Z direction on a lower surface of the actuator plate 54. In the illustrative example, the first common electrode 81*a* is formed at a position including a central portion in the X direction in the pressure chamber 61. It should be noted that the first common electrode 81*a* can arbitrarily be changed regarding the width, the position, and so on in the X direction providing the first common electrode 81*a* is formed at the position opposed to the pressure chamber 61.

As shown in FIG. 4 and FIG. 7, the second common electrodes 81*b* linearly extend in the Y direction at positions which do not overlap the first common electrode 81*a* of the corresponding pressure chamber 61 when viewed from the Z direction on the upper surface of the actuator plate 54. In the present embodiment, the second common electrodes 81*b* are respectively formed at both sides in the X direction with respect to the first common electrode 81*a*. The second common electrodes 81*b* are formed at the positions symmetric about the central portion in the X direction in the pressure chamber 61.

When viewed from the Z direction, a part of the second common electrode 81*b* (hereinafter referred to as a +X-side common electrode 81*b*1) located at the +X side out of the second common electrodes 81*b* overlaps the partitioning wall 62 (hereinafter referred to as a partition wall 62*a*) located at the +X side out of the partition walls 62 for partitioning the corresponding pressure chamber 61. A remaining part of the +X-side common electrode 81*b*1 spreads toward the −X side with respect to the partition wall 62*a*. In other words, the remaining part of the +X-side common electrode 81*b*1 overlaps a part of the pressure chamber 61 when viewed from the Z direction.

When viewed from the Z direction, a part of the second common electrode 81*b* (hereinafter referred to as a −X-side common electrode 81*b*2) located at the −X side out of the second common electrodes 81*b* overlaps the partitioning wall 62 (hereinafter referred to as a partition wall 62*b*) located at the −X side out of the partition walls 62 for partitioning the corresponding pressure chamber 61. It should be noted that between the pressure chambers 61 adjacent to each other, the +X-side common electrode 81*b*1 in one of the pressure chambers 61 and the −X-side common electrode 81*b*2 in the other of the pressure chambers 61 are at a distance from each other in the X direction on the partition wall 62.

A remaining part of the −X-side common electrode 81*b*2 spreads toward the +X side with respect to the partition wall 62*b*. In other words, the remaining part of the −X-side common electrode 81*b*2 overlaps a part of the pressure chamber 61 when viewed from the Z direction. It should be noted that it is preferable for a width D1 in the Y direction in the first common electrode 81*a* to be larger compared to a width D2 in the Y direction in a portion overlapping the pressure chamber 61 out of the second common electrodes 81*b*.

As shown in FIG. 6, the lower-surface patterned interconnection 81*c* is coupled to the first common electrode 81*a* on the lower surface of the actuator plate 54. The lower-surface patterned interconnection 81*c* extends from the −Y-side end portion in the first common electrode 81*a* toward the +X side. The +X-side end portion in the lower-surface patterned interconnection 81*c* extends to a position overlapping a central portion in the X direction in the partition wall 62*a* when viewed from the Z direction.

As shown in FIG. 7, the upper-surface patterned interconnection 81*d* is coupled to the second common electrodes 81*b* in a lump on the upper surface of the actuator plate 54. The upper-surface patterned interconnection 81*d* extends in the X direction in a state of being coupled to the −Y-side end portion in each of the second common electrodes 81*b*. The +X-side end portion in the upper-surface patterned interconnection 81*d* extends to a position overlapping the central portion in the X direction in the partition wall 62*a* when viewed from the Z direction.

As shown in FIG. 4, FIG. 6, and FIG. 7, the through interconnection 81*e* couples the lower-surface patterned interconnection 81*c* and the upper-surface patterned interconnection 81*d* to each other. The through interconnection 81*e* is disposed so as to penetrate the actuator plate 54 in the Z direction. Specifically, in the actuator plate 54, an interconnecting through hole 91 is formed in a portion located at the +X side of the +X-side common electrode 81*b*1. In the present embodiment, the interconnecting through hole 91 is formed in a portion overlapping the central portion in the X direction in the partition wall 62*a* out of the actuator plate 54 when viewed from the Z direction. The interconnecting through hole 91 extends in the Y direction along the +X-side common electrode 81*b*1. In the illustrative example, the length in the Y direction of the interconnecting through hole 91 is set to a length slightly longer than the +X-side common electrode 81*b*1, and shorter than the pressure chamber 61. It should be noted that the length in the Y direction of the interconnecting through hole 91 can arbitrarily be changed.

The through interconnection 81*e* is formed on an inner surface of the interconnecting through hole 91. The through interconnection 81*e* is formed at least throughout the entire area in the Z direction on the inner surface of the interconnecting through hole 91. The through interconnection 81*e* is coupled to the lower-surface patterned interconnection 81*c* at a lower-end opening edge of the interconnecting through hole 91 on the one hand, and is coupled to the upper-surface patterned interconnection 81*d* at an upper-end opening edge of the interconnecting through hole 91 on the other hand. It should be noted that the through interconnection 81*e* can be formed throughout the entire circumference in the inner surface of the interconnecting through hole 91.

As shown in FIG. 6, the common coupling interconnection 81*f* couples the through interconnection 81*e* and the common pad 81*g* on the lower surface of the actuator plate 54. Specifically, the common coupling interconnection 81*f* extends in the Y direction at the +Y side of the through interconnection 81*e*.

A −Y-side end portion of the common coupling interconnection 81*f* is coupled to the through interconnection 81*e* at the lower-end opening edge of the interconnecting through hole 91. A +Y-side end portion of the common coupling interconnection 81*f* is terminated on the tail part 65.

The common pad 81*g* is coupled to the common coupling interconnection 81*f* on a lower surface of the tail part 65. The common pad 81*g* extends in the X direction on the lower surface of the tail part 65.

As shown in FIG. 6 and FIG. 7, the individual interconnection 82 is provided with first individual electrodes 82*a*, a second individual electrode 82*b*, a lower-surface patterned interconnection 82*c*, an upper-surface patterned interconnection 82*d*, a through interconnection 82*e*, an individual coupling interconnection 82*f*, an individual pad 82*g*, and an inner-surface interconnection 82*h*. It should be noted that it is preferable to dispose an insulator (e.g., $SiO_2$) not shown between the actuator plate 54 and the portions (the lower-surface patterned interconnection 82*c*, the upper-surface patterned interconnection 82*d*, the through interconnection 82*e*, the individual coupling interconnection 82*f*, and the individual pad 82*g*) other than the individual electrodes 82*a*, 82*b* out of the individual interconnection 82.

As shown in FIG. 4 and FIG. 6, the first individual electrodes 82*a* are respectively formed in portions located at both sides in the X direction with respect to the first common electrode 81*a* on the lower surface of the actuator plate 54. The first individual electrodes 82*a* extend in the Y direction in a state of being separated in the X direction from the first common electrode 81*a*. The first individual electrodes 82*a* generate a potential difference from the first common electrode 81*a*. A width D3 in the X direction in the first individual electrode 82*a* is narrower than the width D1 in the X direction in the first common electrode 81*a*.

In the first individual electrodes 82*a*, the whole of the first individual electrode 82*a* (hereinafter referred to as a +X-side individual electrode 82*a*1) located at the +X side overlaps the partition wall 62*a* when viewed from the Z direction. The +X-side individual electrode 82*a*1 is opposed to a part of the +X-side common electrode 81*b*1 in the Z direction on the partition wall 62*a*. In contrast, in the first individual electrodes 82*a*, the whole of the first individual electrode 82*a* (hereinafter referred to as a −X-side individual electrode 82*a*2) located at the −X side overlaps the partition wall 62*b* when viewed from the Z direction. The −X-side individual electrode 82*a*2 is opposed to a part of the −X-side common electrode 81*b*2 in the Z direction on the partition wall 62*b*. The first individual electrodes 82*a* generate a potential difference from the second common electrodes 81*b* opposed thereto in the Z direction.

As shown in FIG. 4 and FIG. 7, the second individual electrode 82*b* is formed in a portion located between the second common electrodes 81*b* on the upper surface of the actuator plate 54. The second individual electrode 82*b* extends in the Y direction in a state of being separated in the X direction from the first common electrode 81*a*. Therefore, the whole of the second individual electrode 82*b* overlaps the corresponding pressure chamber 61 when viewed from the Z direction. The second individual electrode 82*b* generates a potential difference from the second common electrodes 81*b*. At least a part of the second individual electrode 82*b* partially overlaps the first common electrode 81*a* when viewed from the Z direction. Therefore, the second individual electrode 82*b* generates a potential difference from the first common electrode 81*a*. It should be noted that the width in the Y direction in the second individual electrode 82*b* is broader than the width in the Y direction in the second common electrode 81*b*.

As shown in FIG. 6, the lower-surface patterned interconnection 82*c* is coupled to the first individual electrodes 82*a* in a lump on the lower surface of the actuator plate 54. The lower-surface patterned interconnection 82*c* extends in the X direction in a state of being coupled to the +Y-side end portion in each of the first individual electrodes 82*a*. The −X-side end portion in the lower-surface patterned interconnection 82*c* extends to a position overlapping the central portion in the X direction in the partition wall 62*b* when viewed from the Z direction.

As shown in FIG. 7, the upper-surface patterned interconnection 82*d* is coupled to the second individual electrode 82*b* on the upper surface of the actuator plate 54. The upper-surface patterned interconnection 82*d* extends from the +Y-side end portion in the second individual electrode 82*b* toward the −X side. The −X-side end portion in the upper-surface patterned interconnection 82*d* extends to a position overlapping the central portion in the X direction in the partition wall 62*b* when viewed from the Z direction.

As shown in FIG. 4, FIG. 6, and FIG. 7, the through interconnection 82*e* couples the lower-surface patterned interconnection 82*c* and the upper-surface patterned interconnection 82*d* to each other. The through interconnection 82*e* is disposed so as to penetrate the actuator plate 54 in the Z direction. Specifically, in the actuator plate 54, an interconnecting through hole 92 is formed in a portion located at the −X side of the −X-side individual electrode 82*b*2. In the present embodiment, the interconnecting through hole 92 is formed in a portion overlapping the central portion in the X direction in the partition wall 62*b* out of the actuator plate 54 when viewed from the Z direction. In the illustrative example, the length in the Y direction of the interconnecting through hole 92 is set to a length slightly longer than the −X-side individual electrode 82*b*2, and shorter than the pressure chamber 61. It should be noted that the length in the Y direction of the interconnecting through hole 92 can arbitrarily be changed.

On an inner surface of the interconnecting through hole 92, there are formed the through interconnections 82*e* of the pressure chambers 61 adjacent to each other in a state of being separated from each other. In the following description, the through interconnection 82*e* related to the drive interconnection 64A will be described. The through interconnection 82*e* is formed at least throughout the entire area in the Z direction on the inner surface of the interconnecting through hole 92. The through interconnection 82*e* is coupled to the lower-surface patterned interconnection 82*c* at a lower-end opening edge of the interconnecting through hole 92 on the one hand, and is coupled to the upper-surface patterned interconnection 82*d* at an upper-end opening edge of the interconnecting through hole 92 on the other hand. In the illustrative example, the through interconnections 82*e* corresponding to the pressure chambers 61 adjacent to each other are respectively formed on the surfaces opposed to each other in the X direction out of the inner surfaces of the interconnecting through hole 92. Therefore, the through interconnections 82*e* corresponding to the pressure chambers 61 adjacent to each other are segmentalized in the both end portions in the Y direction out of the interconnecting through hole 92.

As shown in FIG. 6, the individual coupling interconnection 82*f* couples the through interconnection 82*e* and the individual pad 82*g* on the lower surface of the actuator plate 54. Specifically, the individual coupling interconnection 82*f* extends toward the +Y side from the through interconnection 82*e*. A −Y-side end portion of the individual coupling interconnection 82*f* is coupled to the through interconnection 82*e* at the lower-end opening edge of the interconnecting through hole 92. A +Y-side end portion of the individual coupling interconnection 82*f* is terminated in a portion located at the +Y side of the common pad 81*g* on the tail part 65.

The individual coupling interconnections 82*f* of the pressure chambers 61 adjacent to each other are adjacent to each other in the X direction on the tail part 65. In a portion of the tail part 65 located between the individual coupling interconnections 82*f* of the pressure chambers 61 adjacent to each other, there is formed an individual separation groove 93. The individual separation groove 93 penetrates the tail part 65 in the Z direction, and at the same time, opens on the +Y-side end surface in the tail part 65.

The individual pad 82*g* is formed in a portion located at the +Y side of the common pad 81*g* on the lower surface of the actuator plate 54. The individual pad 82*g* extends in the X direction on the lower surface of the tail part 65. In the tail part 65, in a portion located between the common pad 81*g* and the individual pad 82*g*, there is formed a common separation groove 94. The common separation groove 94 extends in the X direction with, for example, a length sufficient for straddling the pressure chambers 61 in the tail part 65.

The inner-surface interconnection 82*h* is formed on an inner surface of the individual separation groove 93. The inner-surface interconnections 82*h* of the pressure chambers 61 adjacent to each other are separated in the individual separation groove 93. A dimension in the Z direction in the inner-surface interconnection 82*h* is made larger than the depth of the common separation groove 94. Therefore, the inner-surface interconnection 82*h* continues in the Y direction straddling the common separation groove 94 on the inner surface of the individual separation groove 93. In the inner-surface interconnection 82*h*, a portion located at the −Y side with respect to the common separation groove 94 is coupled to the individual coupling interconnection 82*f* at an opening edge of the individual separation groove 93. In the inner-surface interconnection 82*h*, a portion located at the +Y side with respect to the common separation groove 94 is coupled to the individual coupling interconnection 82*f* (or the individual pad 82*g*) at the opening edge of the individual separation groove 93.

In each of the drive interconnections 64, a portion opposed to the flow channel member 52 is covered with the first film 53. Specifically, in each of the drive interconnections 64, a part of each of the first common electrode 81*a*, the first individual electrodes 82*a*, the lower-surface patterned interconnections 81*c*, 82*c*, the through interconnections 81*e*, 82*e*, and the coupling interconnections 81*f*, 82*f* is covered with the first film 53. In contrast, in the drive interconnection 64, the portions (the common coupling interconnection 81*f*, the individual coupling interconnection 82*f*, the common pad 81*g*, and the individual pad 82*g*) located on the lower surface of the tail part 65 are exposed to the outside.

In the drive interconnection 64, a portion formed on the upper surface of the actuator plate 54 is covered with the second film 55. Specifically, in the drive interconnection 64, the second common electrodes 81*b*, the second individual electrode 82*b*, the upper-surface patterned interconnections 81*d*, 82*d*, and the through interconnections 81*e*, 82*e* are covered with the second film 55.

To the lower surface of the tail part 65, there is pressure-bonded a flexible printed board 95. The flexible printed board 95 is coupled to the common pad 81*g* and the individual pad 82*g* on the lower surface of the tail part 65. The flexible printed board 95 is extracted upward passing through the outside of the actuator plate 54. It should be noted that the common interconnections 81 corresponding to the plurality of pressure chambers 61 are commonalized on the flexible printed board 95.

[Operation Method of Printer 1]

Then, there will hereinafter be described when recording a character, a figure, or the like on the recording target medium P using the printer 1 configured as described above.

It should be noted that it is assumed that as an initial state, the sufficient ink having colors different from each other is respectively encapsulated in the four ink tanks 4 shown in FIG. 1. Further, there is provided a state in which the inkjet heads 5 are filled with the ink in the ink tanks 4 via the ink circulation mechanisms 6, respectively.

Under such an initial state, when making the printer 1 operate, the recording target medium P is conveyed toward the +X side while being pinched by the rollers 11, 12 of the conveying mechanisms 2, 3. Further, by the carriage 29 moving in the Y direction at the same time, the inkjet heads 5 mounted on the carriage 29 reciprocate in the Y direction.

While the inkjet heads 5 reciprocate, the ink is arbitrarily ejected toward the recording target medium P from each of the inkjet heads 5. Thus, it is possible to perform recording of the character, the image, and the like on the recording target medium P.

Here, the operation of each of the inkjet heads 5 will hereinafter be described in detail.

In such a recirculating side-shoot type inkjet head 5 as in the present embodiment, first, by making the pressure pump 24 and the suction pump 25 shown in FIG. 2 operate, the ink is circulated in the circulation flow channel 23. In this case, the ink circulating through the ink supply tube 21 is supplied to the inside of each of the pressure chambers 61 through the entrance common ink chambers 66 and the entrance slits 68. The ink supplied to the inside of each of the pressure chambers 61 circulates through the pressure chamber 61 in the Y direction. Subsequently, the ink is discharged to the exit common ink chambers 67 through the exit slits 69, and is then returned to the ink tank 4 through the ink discharge tube 22. Thus, it is possible to circulate the ink between the inkjet head 5 and the ink tank 4.

Then, when the reciprocation of the inkjet heads 5 is started due to the translation of the carriage 29 (see FIG. 1), the drive voltages are applied between the common electrodes 81*a*, 81*b* and the individual electrodes 82*a*, 82*b* via the flexible printed boards 95. On this occasion, the common electrodes 81*a*, 81*b* are set at a reference potential GND, and the individual electrodes 82*a*, 82*b* are set at a drive potential Vdd to apply the drive voltage.

Figure 8:
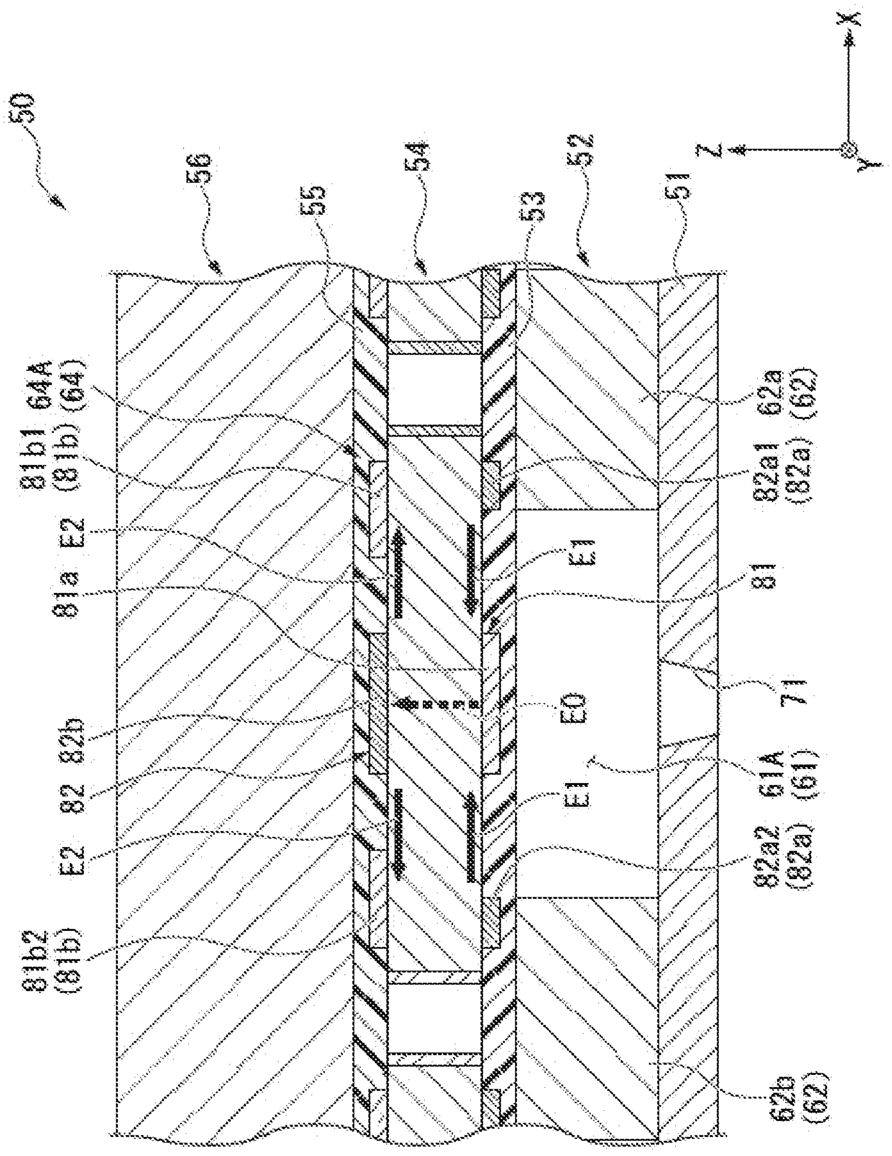
FIG. 8 is an explanatory diagram for explaining a behavior of deformation when ejecting ink regarding the head chip according to the embodiment.

FIG. 8 is an explanatory diagram for explaining a behavior of deformation when ejecting the ink regarding the head chip 50.

As shown in FIG. 8, due to the application of the drive voltage, the potential difference occurs in the X direction between the first common electrode 81*a* and the first individual electrodes 82*a*, and between the second common electrodes 81*b* and the second individual electrode 82*b*. Due to the potential difference having occurred in the X direction, an electric field occurs in the actuator plate 54 in a direction perpendicular to the polarization direction (the Z direction). As a result, the thickness-shear deformation occurs in the actuator plate 54 in the Z direction due to the shear mode. Specifically, on the lower surface of the actuator plate 54, between the first common electrode 81*a* and the first individual electrodes 82*a*, there occurs the electric field in a direction of coming closer to each other in the X direction (see arrows E1). On the upper surface of the actuator plate 54, between the second common electrodes 81*b* and the second individual electrode 82*b*, there occurs the electric field in a direction of getting away from each other in the X direction (see arrows E2). As a result, in the actuator plate 54, a shear deformation occurs upward as proceeding from the both end portions toward the central portion in the X direction in a portion corresponding to each of the pressure chambers 61. Meanwhile, the potential difference occurs in the Z direction between the first common electrode 81*a* and the second individual electrode 82*b*, and between the first individual electrodes 82*a* and the second common electrodes 81*b*. Due to the potential difference having occurred in the Z direction, an electric field occurs (see an arrow E0) in the actuator plate 54 in a direction parallel to the polarization direction (the Z direction). As a result, a stretch and shrink deformation occurs in the actuator plate 54 in the Z direction due to a bend mode. In other words, in the head chip 50 according to the first embodiment, it results that both of the deformation caused by the shear mode and the deformation caused by the bend mode in the actuator plate 54 occur in the Z direction. Specifically, due to the application of the drive voltage, the actuator plate 54 deforms in a direction of getting away from the pressure chamber 61. Thus, the volume in the pressure chamber 61 increases. Subsequently, when making the drive voltage zero, the actuator plate 54 is restored to thereby urge the volume in the pressure chamber 61 to be restored. In the process in which the actuator plate 54 is restored, the pressure in the pressure chamber 61 increases, and thus, the ink in the pressure chamber 61 is ejected outside through the nozzle hole 71. By the ink ejected outside landing on the recording target medium P, print information is recorded on the recording target medium P.

<Method of Manufacturing Head Chip 50>

Figure 9:
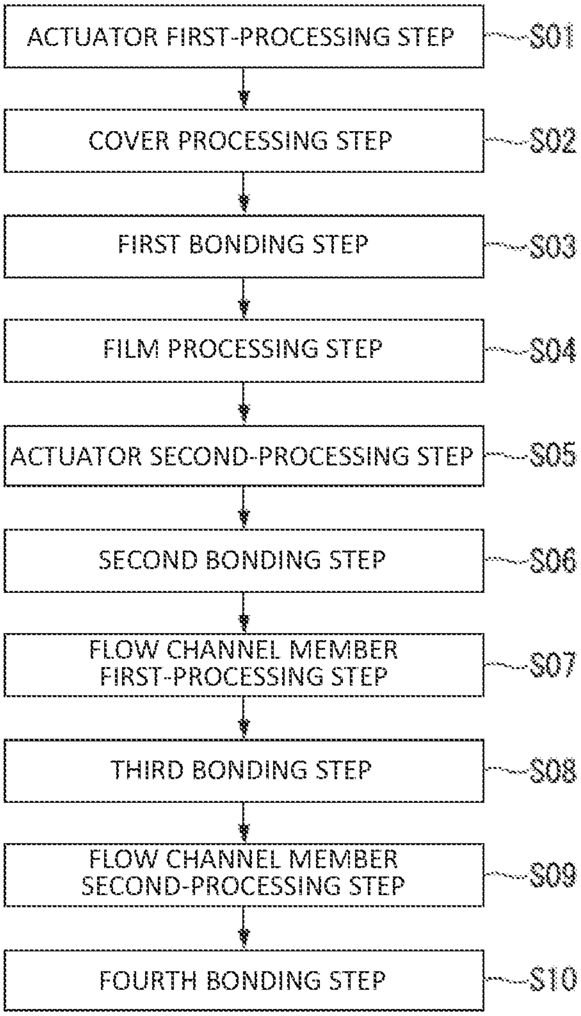
FIG. 9 is a flowchart for explaining a method of manufacturing the head chip according to the embodiment.

Then, a method of manufacturing the head chip 50 described above will be described. FIG. 9 is a flowchart for explaining the method of manufacturing the head chip 50. FIG. 10 through FIG. 20 are each a diagram for explaining a step of the method of manufacturing the head chip 50, and are each a cross-sectional view corresponding to FIG. 4. In the following description, there is described when manufacturing the head chip 50 chip by chip as an example for the sake of convenience.

As shown in FIG. 9, the method of manufacturing the head chip 50 is provided with an actuator first-processing step S01, a cover processing step S02, a first bonding step S03, a film processing step S04, an actuator second-processing step S05, a second bonding step S06, a flow channel member first-processing step S07, a third bonding step S08, a flow channel member second-processing step S09, and a fourth bonding step S10.

Figure 10:
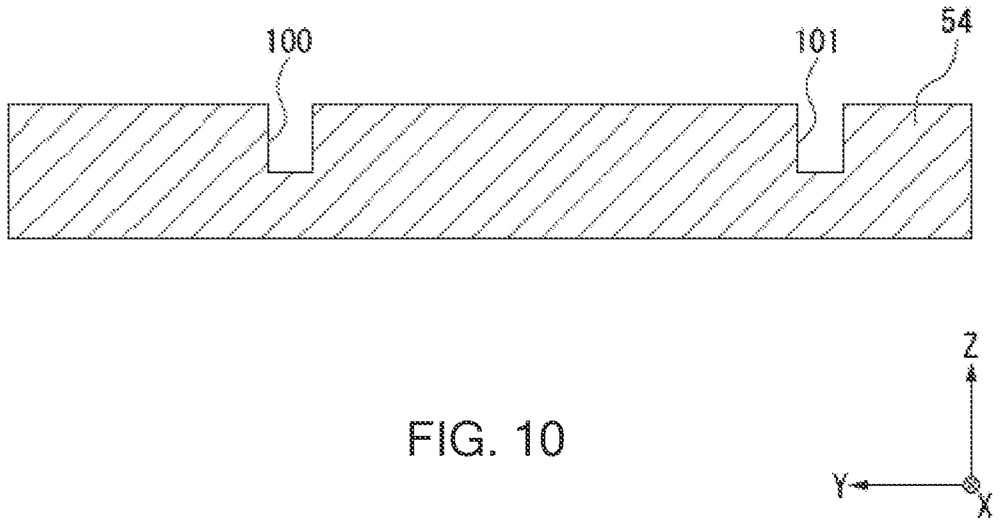
FIG. 10 is a diagram for explaining a step of the method of manufacturing the head chip according to the embodiment, and is a cross-sectional view corresponding to FIG. 4.

As shown in FIG. 10, in the actuator first-processing step S01, first, slit-forming recessed parts 100, 101 forming a part of the slits 68, 69 are provided to the actuator plate 54 (a slit-forming recessed part formation step). Specifically, a mask pattern in which formation areas of the slits 68, 69 open is formed on the upper surface of the actuator plate 54. Subsequently, sandblasting and so on are performed on the upper surface of the actuator plate 54 through the mask pattern. Thus, the slit-forming recessed parts 100, 101 recessed from the upper surface are provided to the actuator plate 54. It should be noted that the recessed parts 100, 101 can be formed by dicer processing, precision drill processing, etching processing, or the like. Further, it is possible to form the interconnecting through holes 91, 92 and the individual separation grooves 93 at the same time as the slit-forming recessed parts 100, 101.

Figure 11:
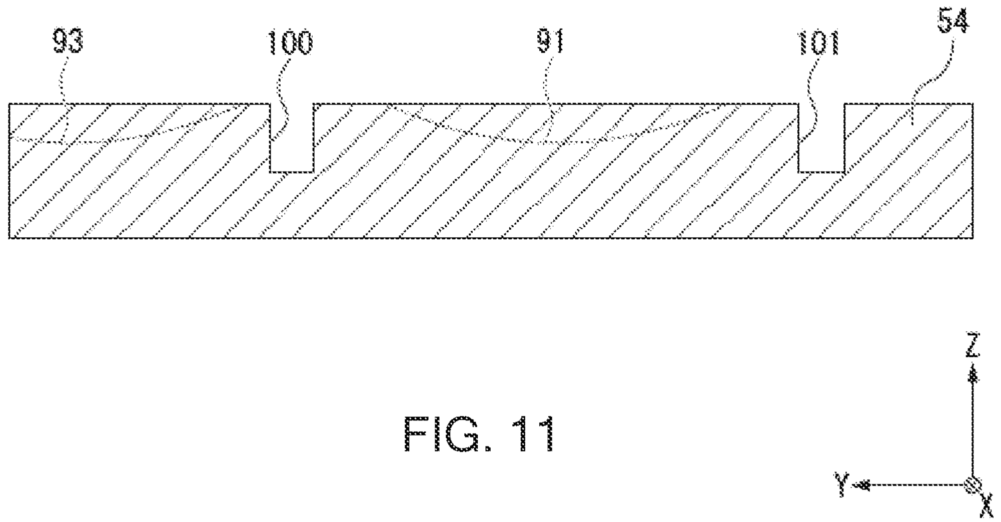
FIG. 11 is a diagram for explaining a step of the method of manufacturing the head chip according to the embodiment, and is a cross-sectional view corresponding to FIG. 4.

Then, in the actuator first-processing step S01, portions located on the upper surface of the actuator plate 54 out of the drive interconnections 64 are formed (an upper-surface interconnection formation step). In the upper-surface interconnection formation step, first, a mask pattern in which formation areas of the drive interconnections 64 open is formed on the upper surface of the actuator plate 54. Then, as shown in FIG. 11, the interconnecting through holes 91, 92 and the individual separation grooves 93 are provided to the actuator plate 54. Formation of the interconnecting through holes 91, 92 and the individual separation grooves 93 is performed by making a dicer enter the actuator plate 54 from, for example, the upper surface side. Then, an electrode material is deposited on the actuator plate 54 using, for example, vapor deposition. The electrode material is deposited on the actuator plate 54 through the mask pattern. Thus, the drive interconnections 64 are formed on the upper surface of the actuator plate 54, the inner surfaces of the interconnecting through holes 91, 92, and the inner surfaces of the individual separation grooves 93.

Figure 12:
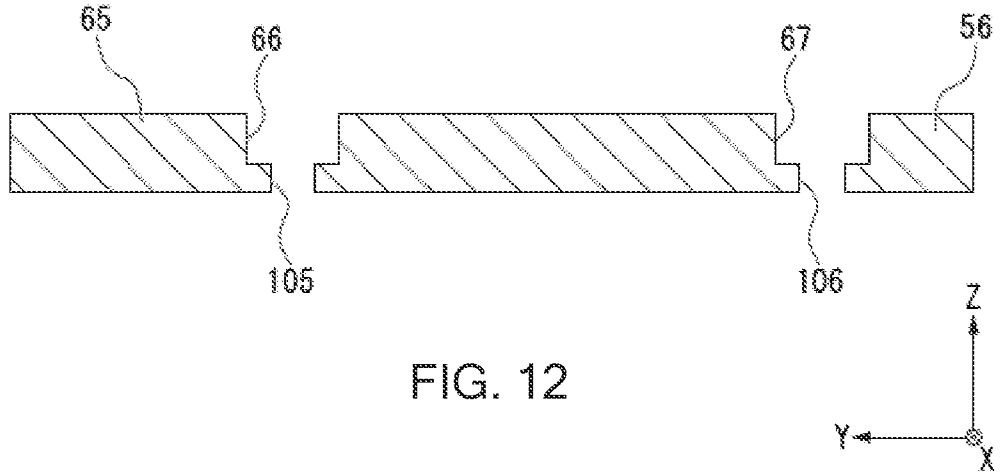
FIG. 12 is a diagram for explaining a step of the method of manufacturing the head chip according to the embodiment, and is a cross-sectional view corresponding to FIG. 4.

As shown in FIG. 12, in the cover processing step S02, the common ink chambers 66, 67, and slit-forming recessed parts 105, 106 to be a part of the slits 68, 69 are provided to the cover plate 56. Specifically, a mask pattern in which portions located in formation areas of the common ink chambers 66, 67 open is formed on the upper surface of the actuator plate 54. Meanwhile, a mask pattern in which formation areas of the slits 68, 69 open is formed on the lower surface of the actuator plate 54. Subsequently, sandblasting and so on are performed on the both surfaces of the actuator plate 54 through the mask patterns. Thus, the common ink chambers 66, 67 and the slit-forming recessed parts 105, 106 are provided to the actuator plate 54.

Figure 13:
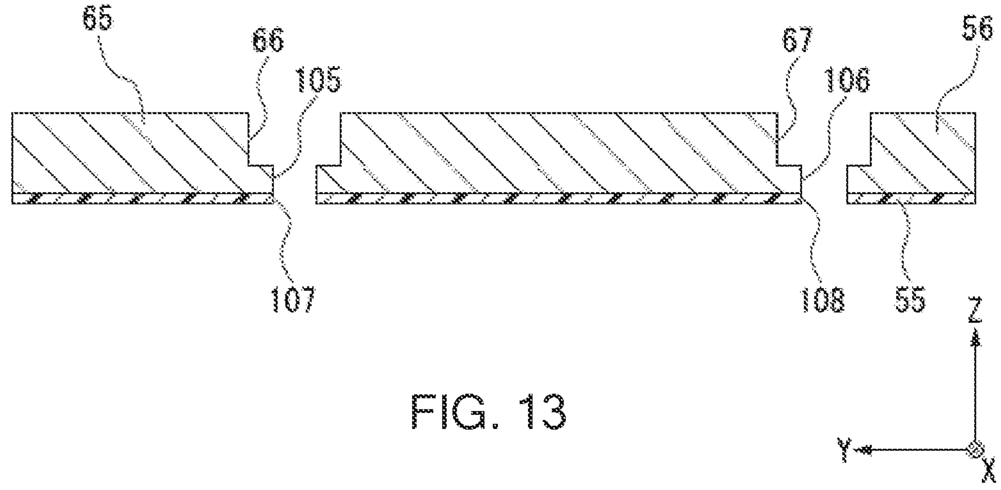
FIG. 13 is a diagram for explaining a step of the method of manufacturing the head chip according to the embodiment, and is a cross-sectional view corresponding to FIG. 4.

As shown in FIG. 13, in the first bonding step S03, the second film 55 is attached to a lower surface of the cover plate 56 with an adhesive or the like.

In the film processing step S04, slit-forming recessed parts 107, 108 to be a part of the slits 68, 69 are provided to the second film 55. It is possible to form the slit-forming recessed parts 107, 108 by performing, for example, laser processing on portions overlapping the corresponding slit-forming recessed parts 105, 106 when viewed from the Z direction out of the second film 55. Thus, the slit-forming recessed parts 105, 107 are communicated with each other, and the slit-forming recessed parts 106, 108 are communicated with each other.

Figure 14:
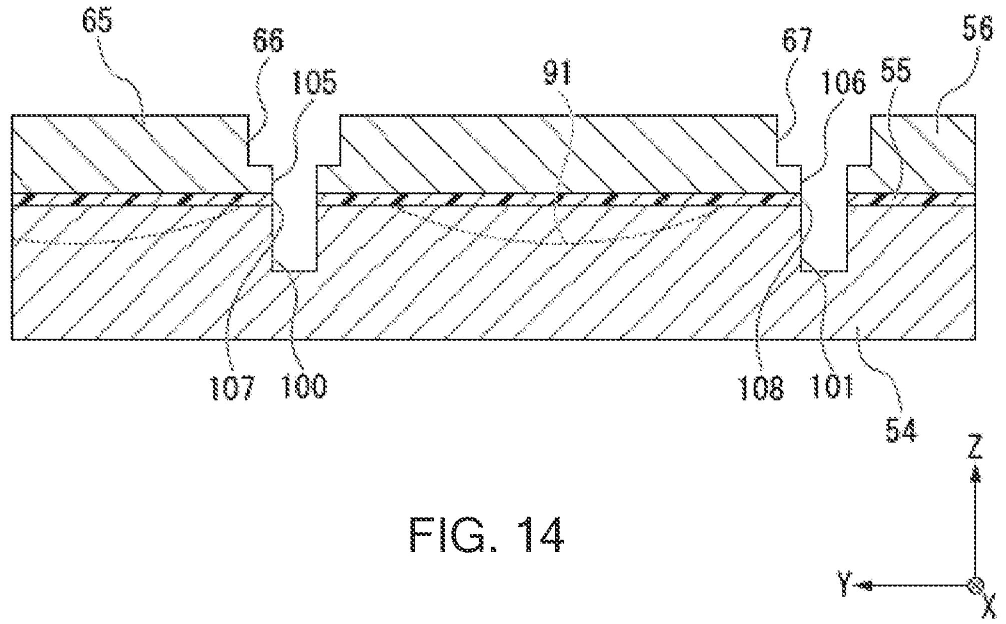
FIG. 14 is a diagram for explaining a step of the method of manufacturing the head chip according to the embodiment, and is a cross-sectional view corresponding to FIG. 4.

As shown in FIG. 14, in the second bonding step S06, the actuator plate 54 is attached to a lower surface of the second film 55 with an adhesive or the like.

Figure 15:
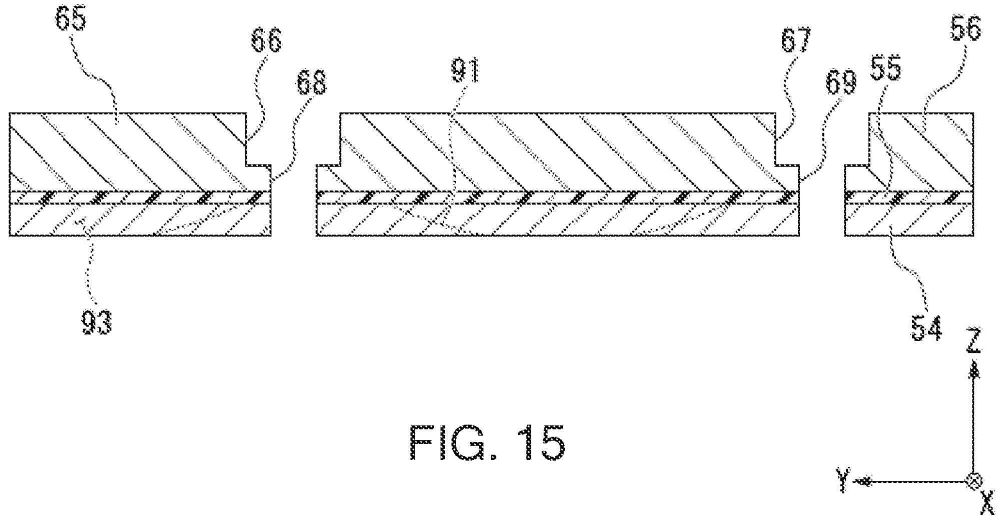
FIG. 15 is a diagram for explaining a step of the method of manufacturing the head chip according to the embodiment, and is a cross-sectional view corresponding to FIG. 4.

As shown in FIG. 15, in the actuator second-processing step S05, grinding processing is performed on the lower surface of the actuator plate 54 (a grinding step). On this occasion, on the lower surface of the actuator plate 54, the actuator plate 54 is ground up to a position where the interconnecting through holes 91, 92 and the individual separation grooves 93 open.

Then, in the actuator second-processing step S05, portions located on the lower surface of the actuator plate 54 out of the drive interconnections 64 are formed (a lower-surface interconnection formation step). In the lower-surface interconnection formation step, first, a mask pattern in which formation areas of the drive interconnections 64 open is formed on the lower surface of the actuator plate 54. Subsequently, an electrode material is deposited on the actuator plate 54 using, for example, vapor deposition. The electrode material is deposited on the actuator plate 54 through the mask pattern. Thus, the drive interconnections 64 are formed on the lower surface of the actuator plate 54, the inner surfaces of the interconnecting through holes 91, 92, and the inner surfaces of the individual separation grooves 93.

Figure 16:
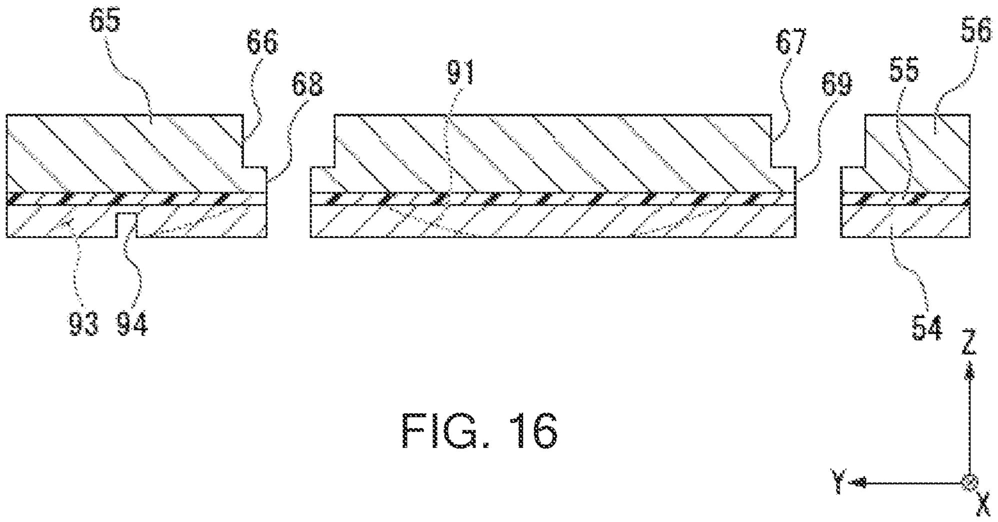
FIG. 16 is a diagram for explaining a step of the method of manufacturing the head chip according to the embodiment, and is a cross-sectional view corresponding to FIG. 4.

As shown in FIG. 16, in the actuator second-processing step S05, the common separation grooves 94 are provided to the tail part 65. Formation of the common separation grooves 94 is performed by making a dicer enter the actuator plate 54 from, for example, the lower surface side.

Figure 17:
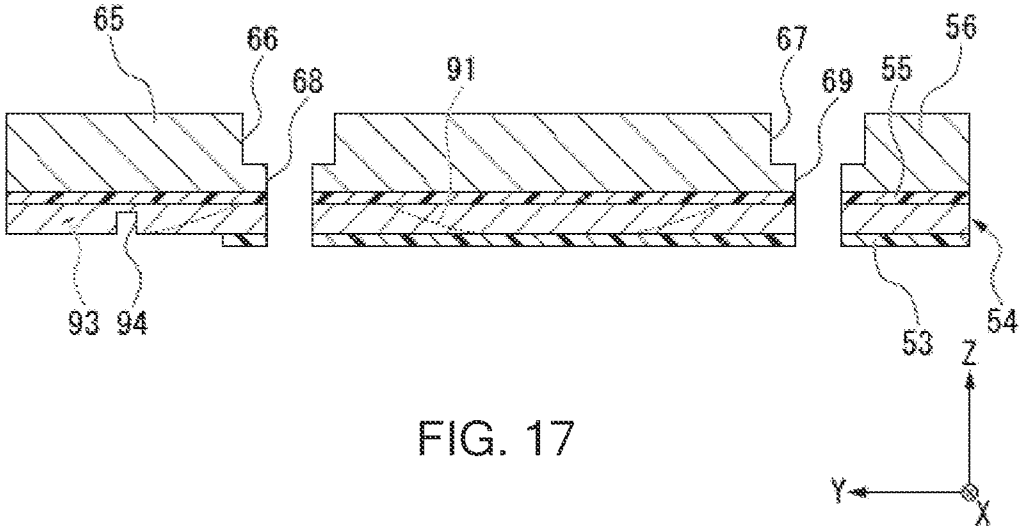
FIG. 17 is a diagram for explaining a step of the method of manufacturing the head chip according to the embodiment, and is a cross-sectional view corresponding to FIG. 4.

As shown in FIG. 17, in the second bonding step S06, the first film 53 is attached to the lower surface of the actuator plate 54 with an adhesive or the like.

Figure 18:
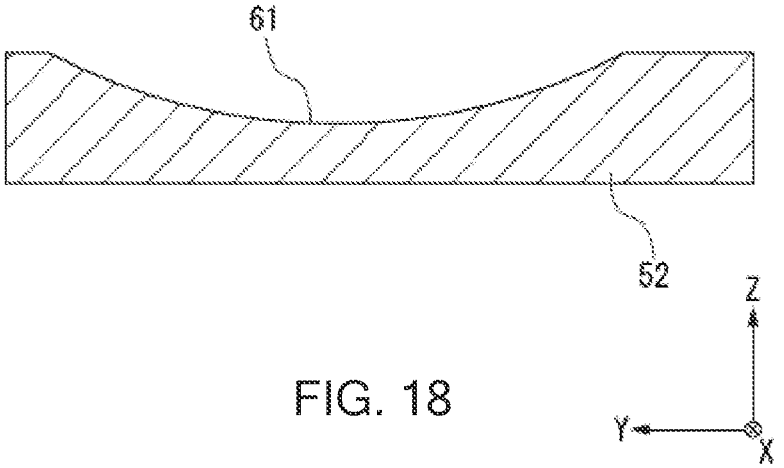
FIG. 18 is a diagram for explaining a step of the method of manufacturing the head chip according to the embodiment, and is a cross-sectional view corresponding to FIG. 4.

As shown in FIG. 18, in the flow channel member first-processing step S07, the pressure chambers 61 are provided to the flow channel member 52. Specifically, the formation is performed by making a dicer enter the flow channel member 52 from, for example, the upper surface side.

Figure 19:
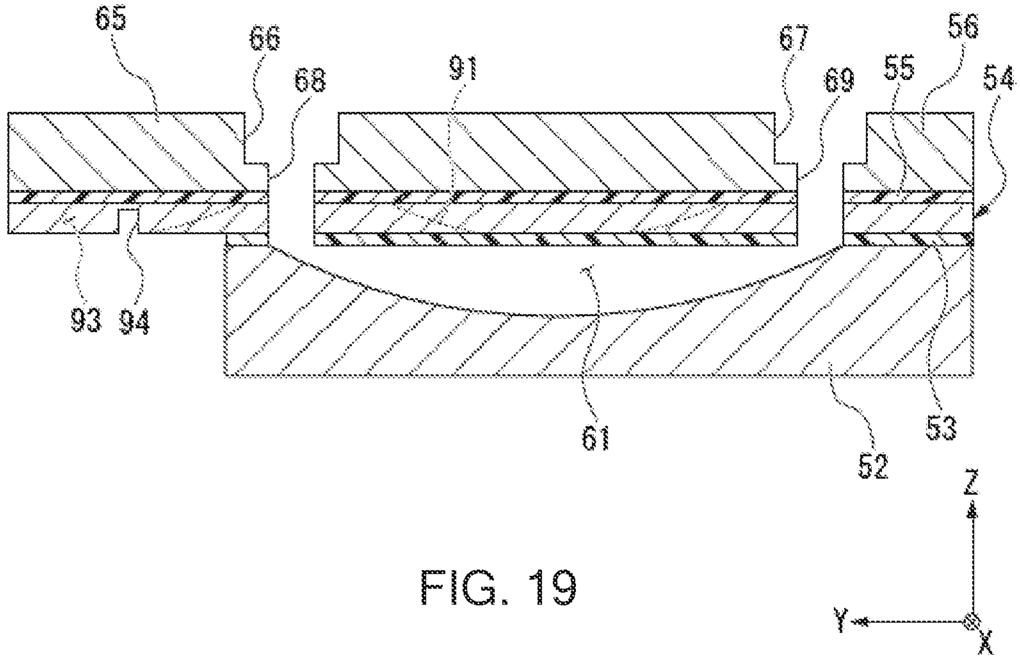
FIG. 19 is a diagram for explaining a step of the method of manufacturing the head chip according to the embodiment, and is a cross-sectional view corresponding to FIG. 4.

As shown in FIG. 19, in the third bonding step S08, the flow channel member 52 is attached to the lower surface of the first film 53 with an adhesive or the like.

Figure 20:
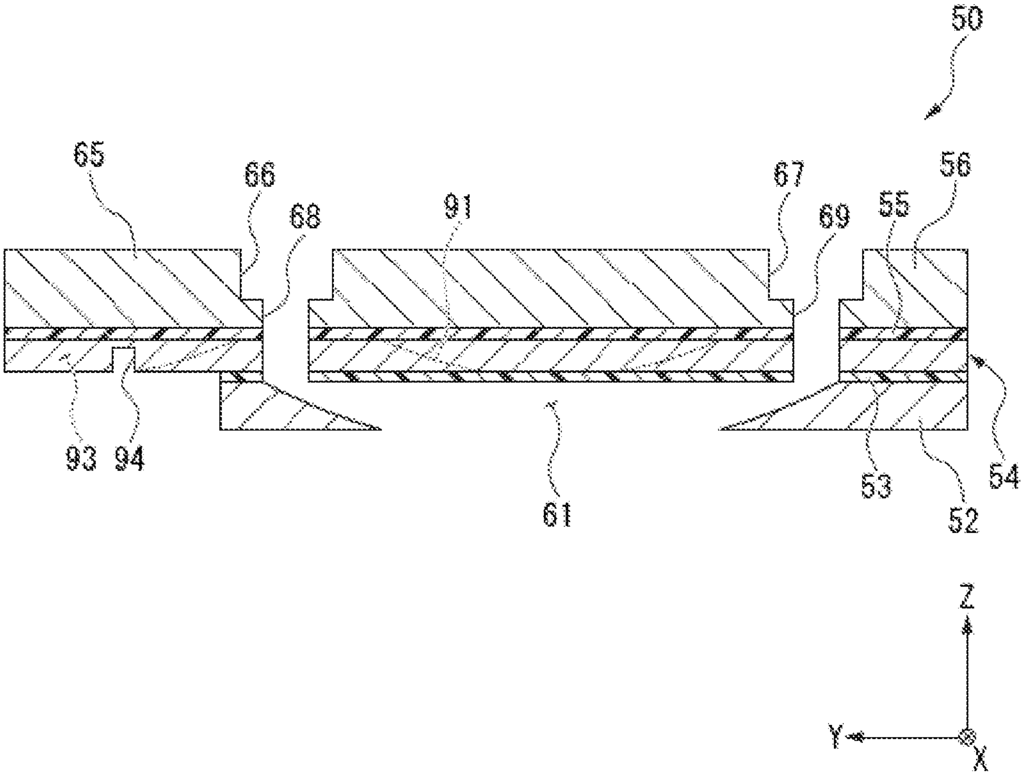
FIG. 20 is a diagram for explaining a step of the method of manufacturing the head chip according to the embodiment, and is a cross-sectional view corresponding to FIG. 4.

As shown in FIG. 20, in the flow channel member second-processing step S09, grinding processing is performed on the lower surface of the flow channel member 52 (a grinding step). On this occasion, on the lower surface of the flow channel member 52, the flow channel member 52 is ground up to a position where the pressure chambers 61 open.

In the fourth bonding step S10, the nozzle plate 51 is attached to the lower surface of the flow channel member 52 in a state in which the nozzle holes 71 and the pressure chambers 61 are aligned with each other.

Due to the steps described hereinabove, the head chip 50 is completed.

Here, in the present embodiment, there is adopted the configuration provided with the electrodes 81*a*, 81*b*, 82*a*, and 82*b* as the drive electrodes which are formed on the surface facing to the Z direction (a first direction) out of the actuator plate 54, and which deform the actuator plate 54 in the Z direction to change the volume of the pressure chamber 61, and the cover plate 56 as a non-drive member which is stacked at the opposite side to the flow channel member 52 across the actuator plate 54, and which regulates a displacement of the actuator plate 54 toward the opposite side to the flow channel member 52 in the Z direction.

According to this configuration, it is possible to regulate the displacement of the actuator plate 54 toward the opposite side to the flow channel member 52 in the Z direction with respect to the resistive force of the ink acting on the actuator plate 54 due to, for example, the pressure of the ink in the pressure chamber using the cover plate 56. Thus, it results that the actuator plate 54 exhibits the theoretical deformation behavior due to the application of the voltage, and it is possible to effectively transfer the deformation of the actuator plate 54 toward the pressure chamber 61. Here, the head chip 50 according to the present embodiment adopts the configuration (so-called pulling-shoot) of deforming the actuator plate 54 in the direction of increasing the volume of the pressure chamber 61 due to the application of the drive voltage, and then restoring the actuator plate 54 to thereby eject the ink. Therefore, when setting the drive voltage to zero in the state (the state in which the actuator plate 54 deforms to the opposite side to the pressure chamber 61) of applying the drive voltage, it becomes easy to restore the actuator plate 54 to an initial position. Therefore, when setting the drive voltage to zero, it is possible to effectively apply the pressure to the ink in the pressure chamber 61.

Moreover, unlike the case of ensuring the rigidity which can bear the resistive force of the ink by increasing the thickness of the actuator plate itself, it is possible to keep the thickness of the actuator plate 54, and therefore, it is possible to efficiently drive the actuator plate 54. As a result, it is possible to increase the pressure generated in the pressure chamber 61 when deforming the actuator plate 54 to thereby achieve power saving.

In the present embodiment, there is adopted the configuration in which the cover plate 56 is thicker in thickness in the Z direction than the actuator plate 54.

According to this configuration, since it becomes easy to ensure the rigidity of the cover plate 56, when deforming the actuator plate 54, the displacement of the actuator plate 54 toward the opposite side to the flow channel member 52 in the Z direction is effectively regulated, and thus, it becomes easy for the actuator plate 54 to exhibit the theoretical deformation behavior due to the application of the voltage.

In the present embodiment, there is adopted the configuration in which the head chip 50 is provided with the second film (a first buffer) 55 lower in compressive elasticity modulus than the actuator plate 54, and the cover plate (a rigid member) 56 which is disposed at the opposite side to the actuator plate 54 across the second film 55, and which is higher in compressive elasticity modulus than the second film 55.

According to this configuration, the second film 55 is arranged between the cover plate 56 and the actuator plate 54. Thus, by the second film 55 deforming due to the deformation of the actuator plate 54, it is possible to regulate the displacement of the actuator plate 54 by the cover plate 56 while allowing the deformation of the actuator plate 54. Thus, it is possible to ensure the deformation amount corresponding to the voltages to be applied to the electrodes 81*a*, 81*b*, 82*a*, and 82*b* in the actuator plate 54.

In the present embodiment, there is adopted the configuration in which the plurality of pressure chambers 61 is disposed across the partition walls 62 in the X direction (a second direction), and the cover plate 56 and the second film 55 bridge the partition walls 62 located at the both sides in the X direction with respect to each of the pressure chambers 61.

According to this configuration, since the cover plate 56 and the second film 55 bridge the partition walls 62, it is easy to ensure the rigidity of the cover plate 56 and the second film 55. Thus, the displacement of the actuator plate 54 toward the opposite side to the flow channel member 52 is suppressed, and it becomes easy for the actuator plate 54 to exhibit the theoretical deformation behavior due to the application of the voltage.

In the head chip 50 according to the present embodiment, there is adopted the configuration in which the upper-end opening part of the pressure chamber 61 is closed by the first film 53 (a second buffer) lower in compressive elasticity modulus than the actuator plate 54, and the actuator plate 54 is disposed at the opposite side to the flow channel member 52 across the first film 53.

According to this configuration, it is possible to relax the resistive force of the ink acting through the upper-end opening part of the pressure chamber 61 using the first film 53. Thus, the displacement of the actuator plate 54 toward the opposite side to the flow channel member 52 is suppressed, and it becomes easy for the actuator plate 54 to exhibit the theoretical deformation behavior due to the application of the voltage.

In the inkjet head 5 and the printer 1 according to the present embodiment, since the head chip 50 described above is provided, it is possible to provide the inkjet head 5 and the printer 1 which are power-saving and high-performance.

Other Modified Examples

It should be noted that the scope of the present disclosure is not limited to the embodiment described above, but a variety of modifications can be applied within the scope or the spirit of the present disclosure.

For example, in the embodiment described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiment described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiment described above, there is described when the recording target medium P is paper, but this configuration is not a limitation. The recording target medium P is not limited to paper, but can also be a metal material or a resin material, and can also be food or the like.

In the embodiment described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiment described above, there is described the configuration in which the Z direction coincides with the gravitational direction, but this configuration is not a limitation, and it is also possible to set the Z direction to a direction along the horizontal direction.

In the embodiment described above, the description is presented citing the head chip 50 of the recirculating side-shoot type as an example, but this configuration is not a limitation. The head chip can be of a so-called edge-shoot type for ejecting the ink from an end portion in the extending direction (the Y direction) of the pressure chamber 61.

In the embodiment described above, there is described when arranging that the potential difference occurs between the electrodes formed on one surface of the actuator plate 54 and the electrodes formed on the other surface, but this configuration is not a limitation. As shown in, for example, FIG. 21, it is possible to adopt a configuration in which the first common electrode 81*a* and the first individual electrodes 82*a* are formed on the lower surface (the first surface) of the actuator plate 54 on the one hand, and only the second individual electrode 82*b* is formed at a position opposed to the first common electrode 81*a* in the upper surface (the second surface) of the actuator plate 54 on the other hand. Further, as shown in FIG. 22, it is possible to adopt a configuration in which the second common electrodes 81*b* and the second individual electrode 82*b* are formed on the upper surface (the first surface) of the actuator plate 54 on the one hand, and only the first common electrode 81*a* is formed at a position opposed to the second individual electrode 82*b* in the lower surface (the second surface) of the actuator plate 54 on the other hand.

Figure 21:
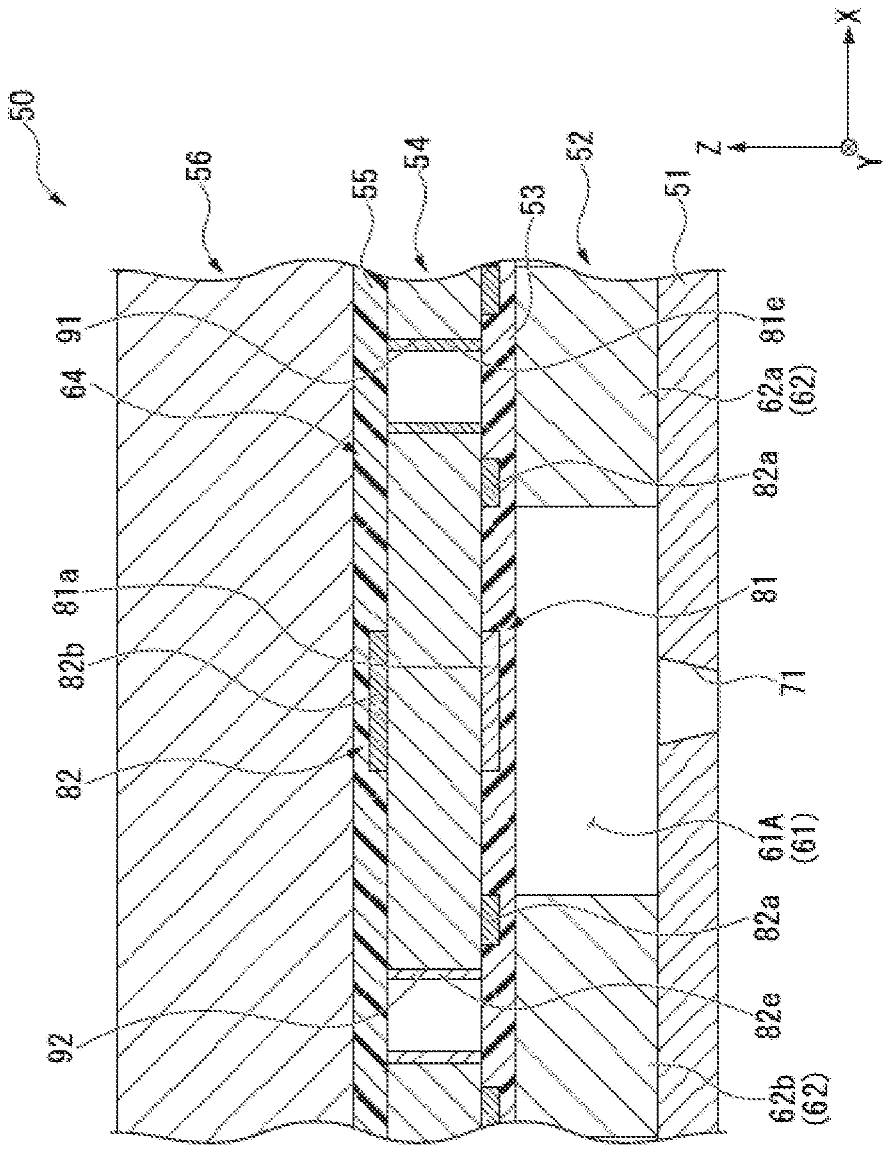
FIG. 21 is a cross-sectional view of a head chip according to a modified example.
Figure 22:
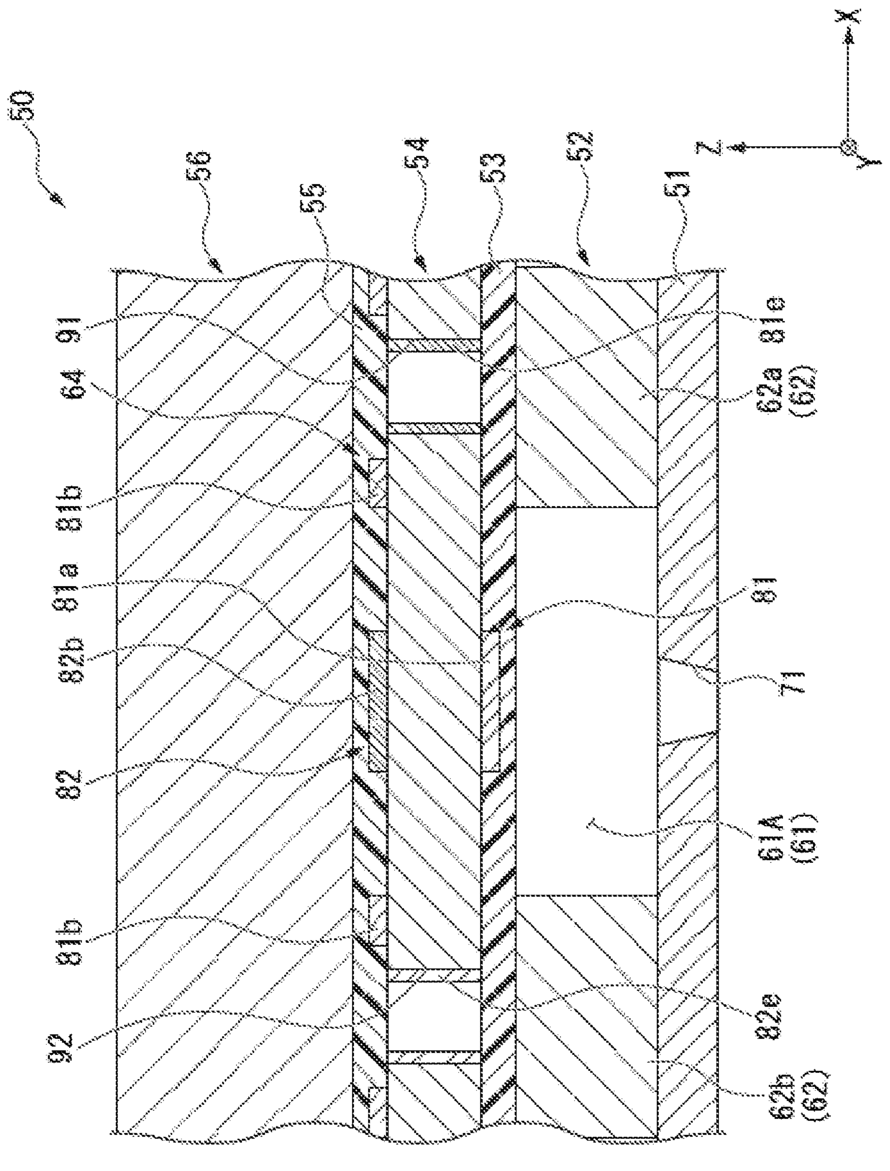
FIG. 22 is a cross-sectional view of a head chip according to a modified example.
Figure 23:
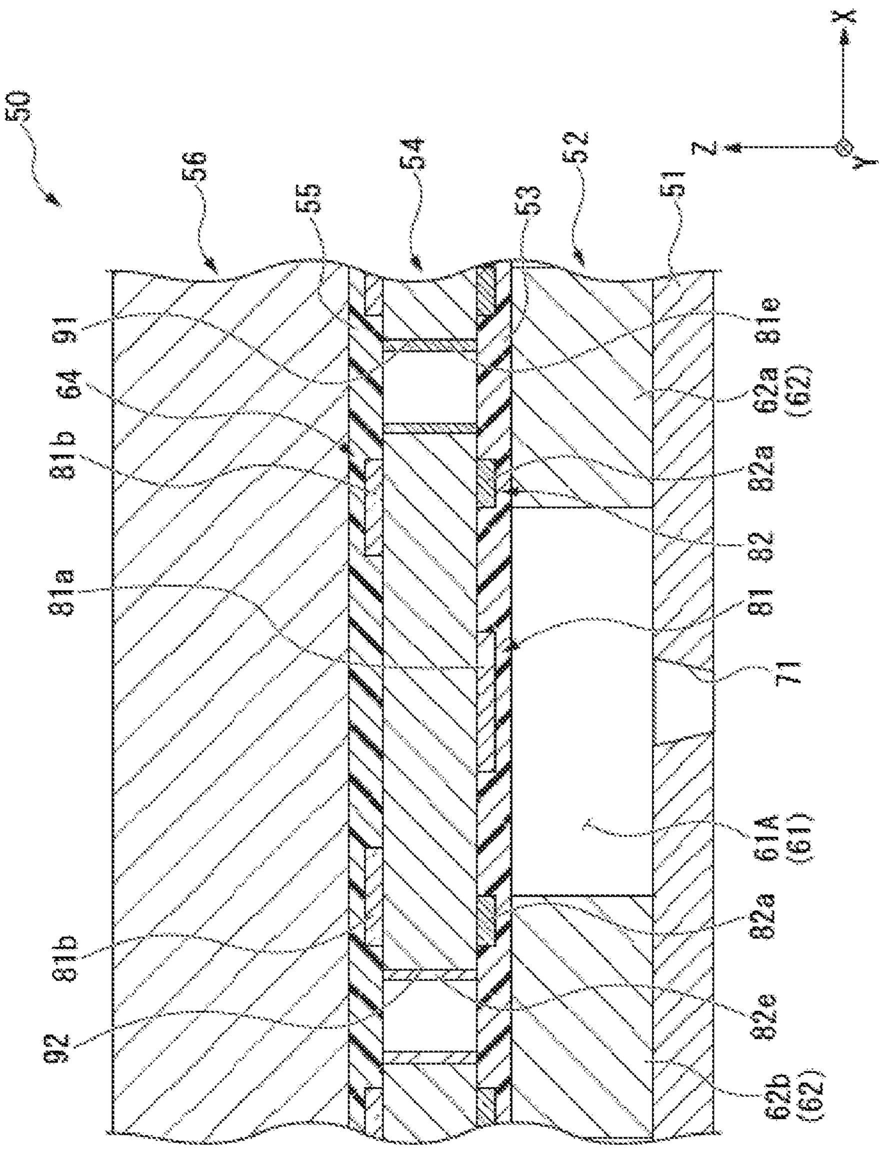
FIG. 23 is a cross-sectional view of a head chip according to a modified example.

Further, in the configuration shown in FIG. 21 described above, there is described the configuration in which the common electrode and the individual electrode are opposed to each other at the position overlapping at least the pressure chamber 61 when viewed from the Z direction, but this configuration is not a limitation. For example, as shown in FIG. 23, it is possible to adopt a configuration in which the first individual electrodes 82*a* and the second common electrodes 81*b* are opposed to each other at only the positions opposite to each other above the partition walls 62 in the state in which the first common electrode 81*a* and the first individual electrodes 82*a* are arranged side by side on the lower surface of the actuator plate 54.

In the embodiment described above, there is described the configuration in which the ink is ejected using the pulling-shoot, but this configuration is not a limitation. It is possible for the head chip according to the present disclosure to be provided with a configuration (so-called pushing-shoot) in which the ink is ejected by deforming the actuator plate 54 in a direction of reducing the volume of the pressure chamber 61 due to the application of the voltage. When performing the pushing-shoot, the actuator plate 54 deforms so as to bulge toward the inside of the pressure chamber 61 due to the application of the drive voltage. Thus, the volume in the pressure chamber 61 decreases to increase the pressure in the pressure chamber 61, and thus, the ink located in the pressure chamber 61 is ejected outside through the nozzle hole 71. When setting the drive voltage to zero, the actuator plate 54 is restored. As a result, the volume in the pressure chamber 61 is restored. It should be noted that the head chip of the pushing-shoot type can be realized by inversely setting either one of the polarization direction and an electric field direction (the layout of the common electrodes and the individual electrodes) of the actuator plate 54 with respect to the head chip of the pulling-shoot type. Even when driving the head chip 50 in the pushing-shoot mode, when applying the drive voltage, it is possible to regulate the displacement of the actuator plate 54 toward the opposite side to the pressure chamber 61, and thus, it is possible to deform the actuator plate 54 with a desired behavior toward the inside of the pressure chamber 61. Therefore, when applying the drive voltage, it is possible to effectively apply the pressure to the ink in the pressure chamber 61.

In the embodiment described above, there is described the configuration in which the electrodes on the both surfaces of the actuator plate 54 are coupled to each other through the through interconnections 81*e*, 82*e*, but this configuration is not a limitation. The coupling of the electrodes on the both surfaces of the actuator plate 54 can arbitrarily be changed. For example, it is possible for the electrodes on the both surfaces of the actuator plate 54 to be coupled to each other through a side surface of the actuator plate 54 or the like.

In the embodiment described above, there is described the configuration in which the actuator plate 54 is deformed due to both of the shear deformation mode and the bend deformation mode, but this configuration is not a limitation. It is sufficient for the actuator plate 54 to be deformable in at least either of the shear deformation mode and the bend deformation mode. When adopting the shear deformation mode alone, the common electrode and the individual electrode are arranged side by side on at least either of the surfaces facing to the Z direction in the actuator plate 54. Thus, it is possible to apply the potential difference in the X direction to the actuator plate 54. In contrast, when adopting the bend deformation mode alone, the common electrode and the individual electrode are arranged on the surfaces opposed to each other in the Z direction in the actuator plate 54. Thus, it is possible to apply the potential difference in the Z direction to the actuator plate 54.

Figure 24:
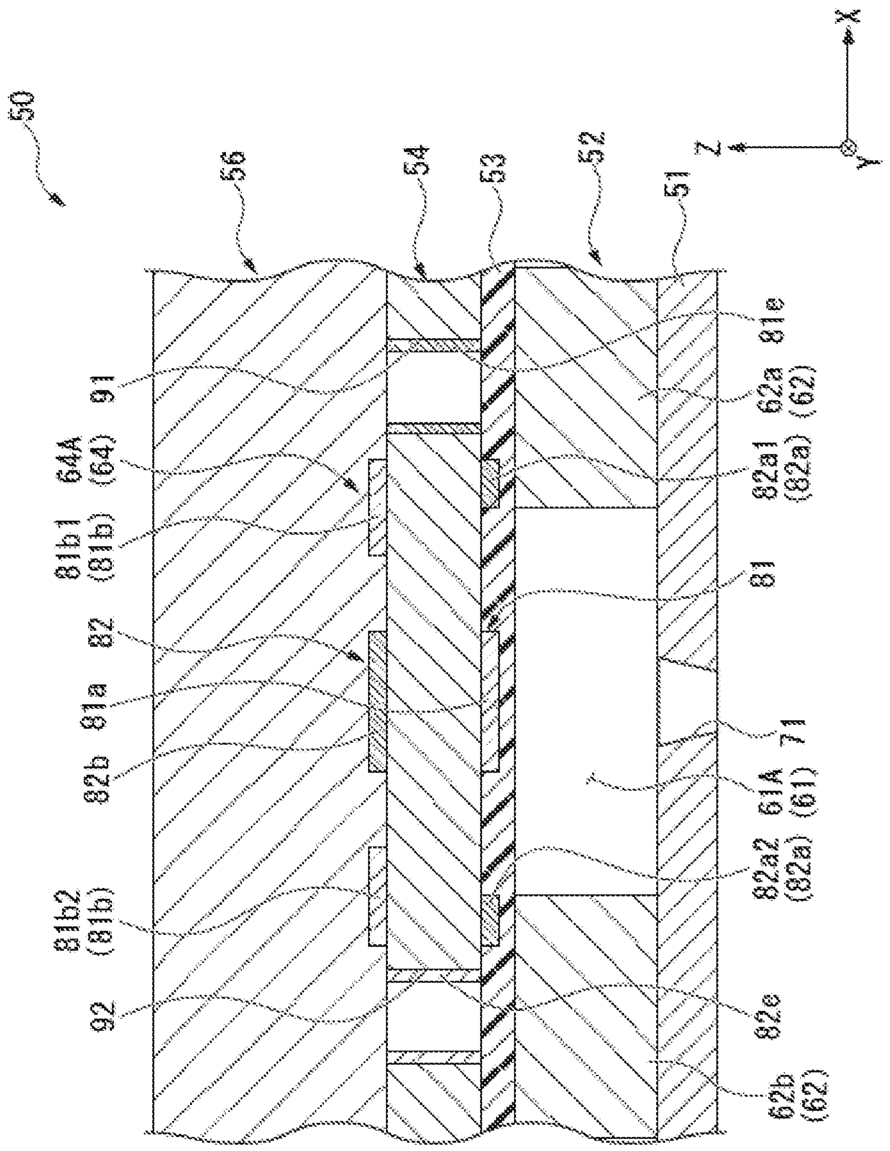
FIG. 24 is a cross-sectional view of a head chip according to a modified example.
Figure 25:
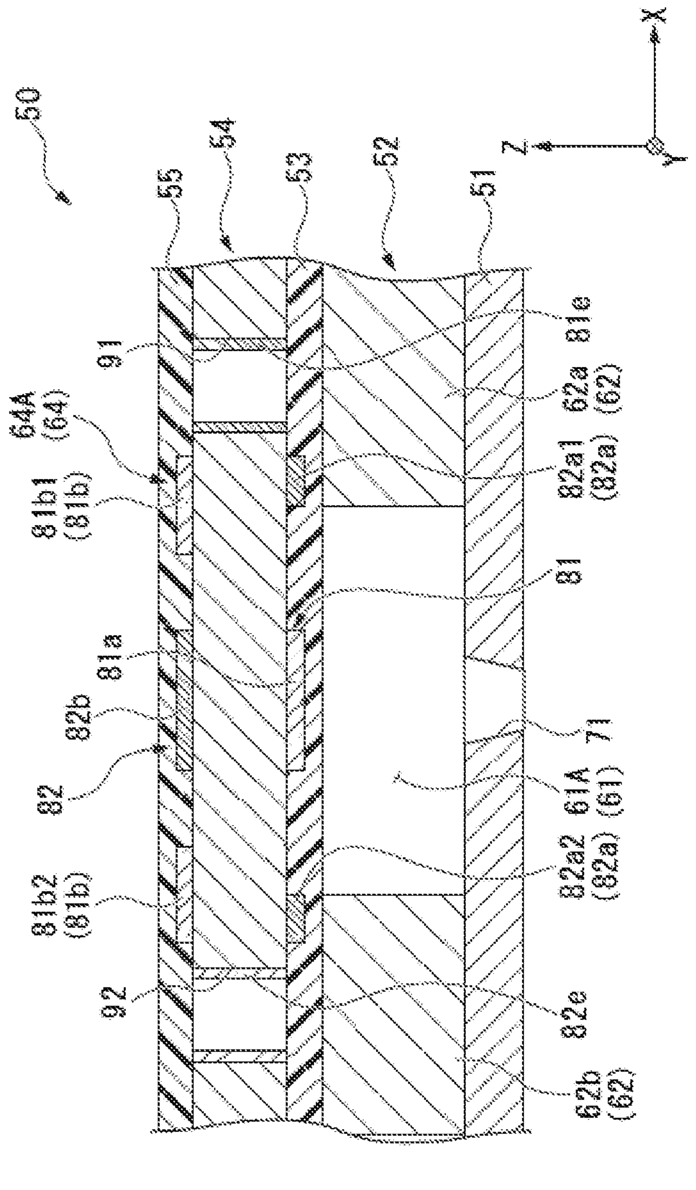
FIG. 25 is a cross-sectional view of a head chip according to a modified example.

In the embodiment described above, there is described when adopting the cover plate 56 and the second film 55 as the non-drive member, but this configuration is not a limitation. It is sufficient for the non-drive member to be a member which does not voluntarily drive (deform) with a voltage or the like. As such a configuration, it is possible to adopt a configuration having only the cover plate 56 as the non-drive member (see FIG. 24), or to adopt a configuration having only the second film 55 (see FIG. 25). Further, as the non-drive member, it is possible to adopt a piezoelectric material similarly to the actuator plate 54. Further, the thickness and so on of the non-drive member can arbitrarily be changed.

In the embodiment described above, there is described when the cover plate 56 is adopted as the rigid member, but this configuration is not a limitation. It is sufficient for the rigid member to be a member having rigidity sufficient to prevent from making a substantive deformation with respect to the resistive force of the ink. It should be noted that it is sufficient for the rigid member to be a member capable of limiting the displacement of the actuator plate 54 toward the opposite side to the pressure chamber 61 caused by the resistive force of the ink, and it is possible for the rigid member to deform within a range of allowing the theoretical deformation behavior of the actuator plate 54 due to the change in drive voltage.

In the embodiment described above, there is described when the films 53, 55 are adopted as the buffers, but this configuration is not a limitation. It is sufficient for the buffer to be a material lower in compressive elasticity modulus than the actuator plate 54 and the cover plate 56, and therefore, the buffer can be, for example, an adhesive.

In the embodiment described above, there is explained the configuration in which the second film 55 and the cover plate 56 as the non-drive members are disposed throughout the entire area of the upper surface of the actuator plate 54 to thereby bridge the partition walls 62 constituting the pressure chamber 61, but this configuration is not a limitation. It is possible for the non-drive member to be disposed only in a portion (a portion located inside the partition walls 62) overlapping the pressure chambers 61 when viewed from the Z direction. According also such a configuration, it is possible to regulate the displacement of the actuator plate 54 toward the opposite side to the flow channel member 52 using the own weight and so on of the non-drive member.

Besides the above, it is arbitrarily possible to replace the constituents in the embodiment described above with known constituents within the scope or the spirit of the present disclosure, and it is also possible to arbitrarily combine the modified examples described above with each other.

What is claimed is:

1. A head chip configured to eject ink drops for printing on a target medium, wherein during printing, the head chip is moved in a scanning direction (Y), the target medium is conveyed in a conveying direction (X) orthogonal to the scanning direction (Y), and the ink drops are ejected in a height direction (Z) orthogonal to both the scanning direction (Y) and the conveying direction (X), the head chip comprising:

a planar flow channel member having a pressure chamber containing liquid therein, wherein the planar flow channel member is placed in an X-Y plane during printing with a thickness thereof in the Z direction;

a planar actuator plate stacked on the planar flow channel member in the Z direction to actuate the pressure chamber to eject the ink drops in the Z direction;

drive electrodes formed on one of opposing surfaces in the Z direction of the planar actuator plate, wherein the drive electrodes are arranged on said one of the surfaces of the planar actuator plate so that the drive electrodes, when energized, strain the planar actuator plate in the X direction to displace the planar actuator plate in the Z direction and change a volume of the pressure chamber; and a non-drive member stacked on the planar actuator plate in the Z direction on a side of the actuator plate opposite to the planar flow channel member, wherein the non-drive member is configured to limit a displacement of the planar actuator plate in the Z direction away from the planar flow channel member.

2. The head chip according to claim 1, wherein the non-drive member has a thickness in the Z direction than a thickness of the planar actuator plate.

3. The head chip according to claim 1, wherein the non-drive member includes a first buffer lower in a compressive elasticity modulus than that of the planar actuator plate, and the non-drive member further includes a rigid member on a side of the non-drive member opposite to the planar actuator plate, wherein the rigid member has a compressive elasticity modulus higher than the compressive elasticity modulus of the first buffer.

4. The head chip according to claim 1, further comprising a plurality of partition walls arranged in the X direction, wherein the pressure chamber is formed between each pair of two adjacent partition walls, and further wherein the non-drive member bridges the pair of two adjacent partition walls in the X direction.

5. The head chip according to claim 1, further including a second buffer having a compressive elasticity modulus lower that that of the planar actuator plate, wherein the pressure chamber includes an opening part formed to open toward the planar actuator plate in the Z direction, and the opening part is closed by the second buffer.

6. A liquid jet head comprising the head chip according to claim 1.

7. A liquid jet recording device comprising the liquid jet head according to claim 6.

* * * * *